(12) United States Patent
Falconetti et al.

(10) Patent No.: US 11,323,230 B2
(45) Date of Patent: May 3, 2022

(54) METHOD AND APPARATUS FOR CHANNEL STATE INFORMATION ACQUISITION IN LOW LATENCY WIRELESS SYSTEMS

(71) Applicant: TELEFONAKTIEBOLAGET LM ERICSSON (PUBL), Stockholm (SE)

(72) Inventors: Laetitia Falconetti, Järfälla (SE); Florent Munier, Västra Frölunda (SE); Sebastian Faxér, Järfälla (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 66 days.

(21) Appl. No.: 16/496,651

(22) PCT Filed: Mar. 23, 2018

(86) PCT No.: PCT/IB2018/052004
§ 371 (c)(1),
(2) Date: Sep. 23, 2019

(87) PCT Pub. No.: WO2018/173003
PCT Pub. Date: Sep. 27, 2018

(65) Prior Publication Data
US 2021/0266132 A1     Aug. 26, 2021

Related U.S. Application Data

(60) Provisional application No. 62/476,649, filed on Mar. 24, 2017.

(51) Int. Cl.
*H04L 12/803* (2013.01)
*H04L 5/00* (2006.01)
(Continued)

(52) U.S. Cl.
CPC .......... *H04L 5/0057* (2013.01); *H04L 5/0044* (2013.01); *H04W 72/042* (2013.01); *H04W 72/0413* (2013.01); *H04W 72/1226* (2013.01)

(58) Field of Classification Search
None
See application file for complete search history.

(56) References Cited

U.S. PATENT DOCUMENTS 9,515,805 B2 * 12/2016 Nammi ................. H04W 76/28
9,882,816 B2 *  1/2018 Xu ....................... H04B 7/0413
(Continued)

OTHER PUBLICATIONS

Huawei et al., "Discussion on CSI feedback for short TTI", 3GPP TSG RAN WG1 Meeting #86, R1-166157, Aug. 21, 2016.
(Continued)

*Primary Examiner* — Sithu Ko
(74) *Attorney, Agent, or Firm* — Withrow & Terranova, PLLC

(57) ABSTRACT

A method of operating a wireless device in a wireless communication network is provided. The method includes reporting channel state information (CSI) by generating, at the wireless device, a CSI report for transmission to a network node that uses the CSI report to make a scheduling decision, dividing the CSI report into a first CSI report portion and a second CSI report portion. The first CSI report portion includes a first payload of data and the second CSI report portion includes a second payload of data that is less than the first payload of data. The first CSI report portion is transmitted on a transmission time interval (TTI) having a first time interval value and the second CSI report portion is transmitted on a short TTI (sTTI). The first CSI report portion and the second CSI report portion include data that is combined to construct the CSI report.

26 Claims, 15 Drawing Sheets

(51) Int. Cl.
*H04W 72/04* (2009.01)
*H04W 72/12* (2009.01)

(56) References Cited

U.S. PATENT DOCUMENTS

| | | | | |
|---|---|---|---|---|
| 10,154,424 | B2* | 12/2018 | Chen | H04L 5/0048 |
| 2015/0117352 | A1* | 4/2015 | Nammi | H04L 5/0058 |
| | | | | 370/329 |
| 2015/0327119 | A1* | 11/2015 | Ko | H04B 7/0639 |
| | | | | 370/252 |
| 2018/0097600 | A1* | 4/2018 | Bagheri | H04W 24/08 |
| 2019/0097693 | A1* | 3/2019 | Park | H04B 7/0417 |
| 2019/0116594 | A1* | 4/2019 | Kwak | H04L 5/0044 |
| 2019/0312669 | A1* | 10/2019 | Kwak | H04L 1/00 |
| 2019/0394768 | A1* | 12/2019 | Kim | H04L 1/1671 |
| 2020/0037349 | A1* | 1/2020 | Gao | H04L 5/001 |

OTHER PUBLICATIONS

Huawei et al., "CQI feedback overhead reduction in short TTI", 3GPP TSG RAN WG1 Meeting #85, R1-164867, May 14, 2016.

Ericsson, "On CSI reporting for sTTI", 3GPP TSG WRAN WG1 Meeting #88, R1-1703270, Feb. 12, 2017.

Nokia et al., "UL DMRS Base Sequences with IFDMA", 3GPP TSG RAN WG1 Meeting #86, R1-167087, Aug. 22-26, 2016.

3GPP TS 36.211 Technical Specification Group Radio Access Network; Evolved Universal Terrestrial Radio Access (E-UTRA); Physical channels and modulation (Release 13); V13.0 0, Jan. 6, 2016, Sections 5.5 and 5.5.2.1.

Ericsson, "NB-IoT—UL Reference signals", 3GPP TSG-RAN WG1 Meeting #84bis, R1-162777, Apr. 11-15, 2016.

Nokia et al. "Control Signalling for UL DMRS with IFDMA", 3GPP TSG RAN WG1 Meeting #86, R1-166341, Aug. 22-26, 2016.

Motorola, "Cubic Metric in 3GPP-LTE", 3GPP TSG RAN WG1 #44, R1-060385, Feb. 13-17, 2006.

3GPP TR 36.881, Technical Specification Group Radio Access Network; Evolved Universal Terrestrial Radio Access (E-UTRA); Study on latency reduction techniques for LTE (Release 14); V1.0.0, May 2016.

Ericsson, "New Work Item on shortened TTI and processing time for LTE", 3GPP TSG RAN Meeting #72, RP-161299, Jun. 13-16, 2016.

* cited by examiner

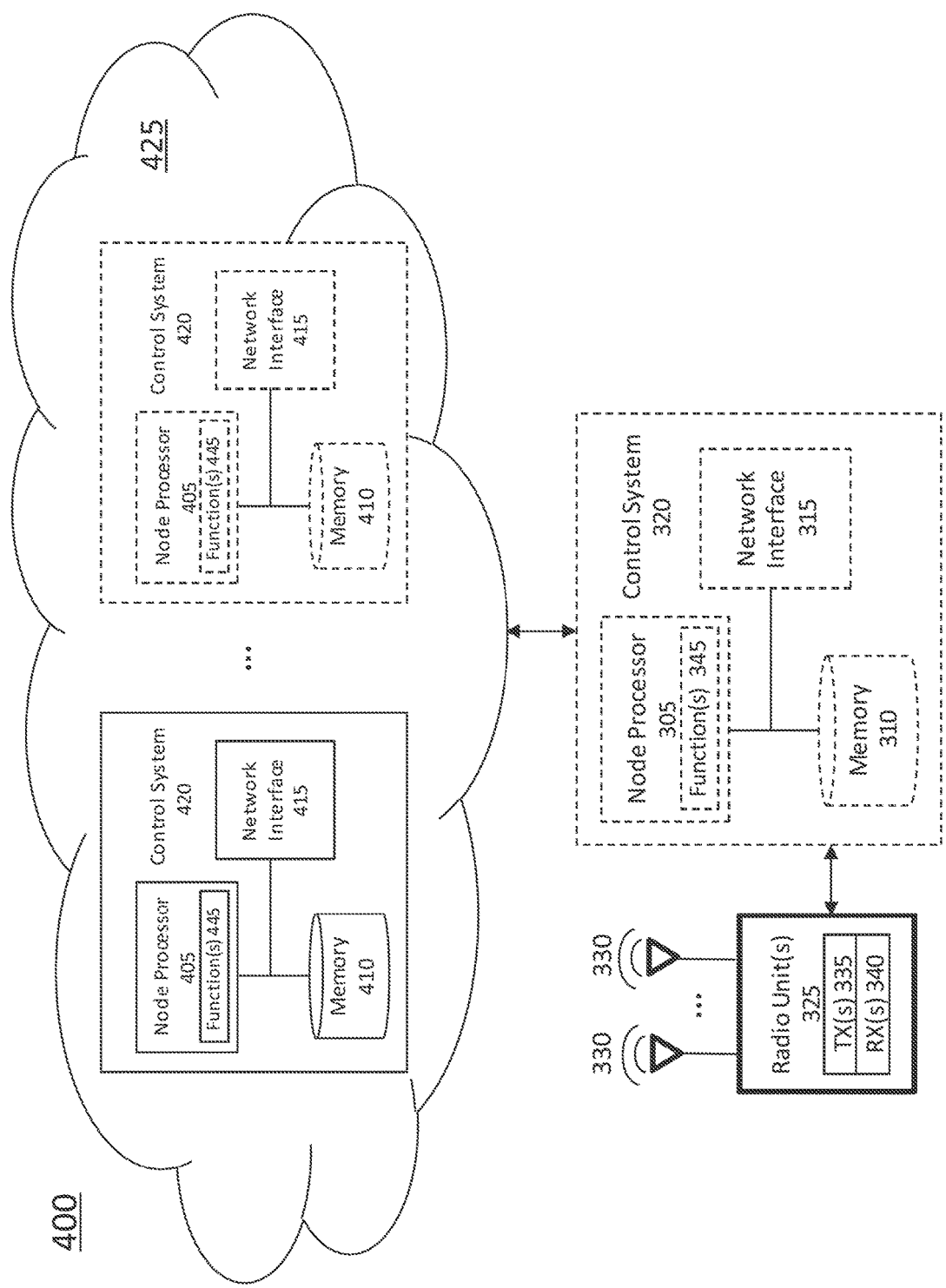

METHOD AND APPARATUS FOR CHANNEL STATE INFORMATION ACQUISITION IN LOW LATENCY WIRELESS SYSTEMS

RELATED APPLICATIONS

This application is a national stage application of International Patent Application No. PCT/IB2018/052004, filed Mar. 23, 2018, which claims the benefit of U.S. provisional patent application Ser. No. 62/476,649, filed Mar. 24, 2017, the disclosures of which are hereby incorporated herein by references in their entirety.

TECHNICAL FIELD

The disclosed subject matter relates generally to telecommunications. Certain embodiments relate more particularly to more particularly to concepts such as LTE, UPLINK, DMRS, and IFDMA.

BACKGROUND

Certain concepts are discussed in this disclosure with respect to LTE systems. However, the disclosed concepts may apply to any technology (e.g. NR, 5G) relying on reference signal transmission where there is a predictable part of the signal that might be distorted, the part of the signal being distorted being known, while the actual distortion is possibly unknown.

In 3GPP LTE systems, data transmissions in both downlink (i.e. from a network node or eNB to a user device or UE) and uplink (from a user device or UE to a network node or eNB) are organized into radio frames of 10 ms, each radio frame consisting of ten equally-sized subframes of length $T_{subframe}=1$ ms. For example, brief reference is made to FIG. 1, which illustrates the LTE time-domain structure.

LTE may use Orthogonal Frequency Division Multiplexing (OFDM) in the downlink and Single Carrier OFDM (SC-OFDM) in the uplink. The basic LTE downlink physical resource can thus be seen as a time-frequency grid as illustrated in FIG. 2, where each resource element corresponds to one OFDM subcarrier during one OFDM symbol interval.

Furthermore, the resource allocation in LTE is typically described in terms of resource blocks (RBs), where a resource block corresponds to one slot (0.5 ms) in the time domain and 12 contiguous subcarriers in the frequency domain. Resource blocks are numbered in the frequency domain, starting with 0 from one end of the system bandwidth.

Similarly, the LTE uplink resource grid is illustrated in FIG. 3, where $N_{RB}^{UL}$ is the number resource blocks (RBs) contained in the uplink system bandwidth, $N_{sc}^{RB}$ is the number subcarriers in each RB, typically $N_{sc}^{RB}=12$, $N_{symb}^{UL}$ is the number of SC-OFDM symbols in each slot. $N_{symb}^{UL}=7$ for normal cyclic prefix (CP) and $N_{symb}^{UL}=6$ for extended CP. A subcarrier and a SC-OFDM symbol forms an uplink resource element (RE).

Downlink data transmissions from an eNB to a UE are dynamically scheduled, i.e., in each subframe the base station transmits control information regarding which terminal data is transmitted and upon which resource blocks the data is transmitted, in the current downlink subframe. This control signaling is typically transmitted in the first 1, 2, 3 or 4 OFDM symbols in each subframe. A downlink system with 3 OFDM symbols as control is illustrated in FIG. 4.

Similar to downlink, uplink transmissions from a UE to an eNB are also dynamically scheduled through the downlink control channel. When a UE receives an uplink grant in subframe n, the UE transmits data in the uplink at subframe n+k, where k=4 for FDD system and k varies for TDD systems.

In LTE, a number of physical channels are supported for data transmissions. A downlink or an uplink physical channel corresponds to a set of resource elements carrying information originating from higher layers. A downlink or an uplink physical signal is used by the physical layer but does not carry information originating from higher layers. Some of the downlink physical channels and signals supported in LTE are:

Physical Downlink Shared Channel, PDSCH
Physical Downlink Control Channel, PDCCH
Enhanced Physical Downlink Control Channel, EPDCCH
Reference signals:
  Cell Specific Reference Signals (CRS)
  DeModulation Reference Signal (DMRS) for PDSCH
  Channel State Information Reference Signals (CSI-RS).

PDSCH is used mainly for carrying user traffic data and higher layer messages in the downlink and may be transmitted in a DL subframe outside of the control region. Both PDCCH and EPDCCH are used to carry Downlink Control Information (DCI), such as PRB allocation, modulation level and coding scheme (MCS) and the precoder used at the transmitter, among others. PDCCH is transmitted in the first one to four OFDM symbols in a DL subframe, i.e. the control region, while EPDCCH is transmitted in the same region as PDSCH.

Some of the uplink physical channels and signals supported in LTE are:

Physical Uplink Shared Channel, PUSCH
Physical Uplink Control Channel, PUCCH
DeModulation Reference Signal (DMRS) for PUSCH
DeModulation Reference Signal (DMRS) for PUCCH The PUSCH is used to carry uplink data or/and uplink control information from the UE to the eNodeB. The PUCCH is used to carry uplink control information from the UE to the eNodeB.

Packet data latency is one of the performance metrics that vendors, operators, and end-users (via speed test applications) regularly measure. Latency measurements are done in all phases of a radio access network system lifetime, including when verifying a new software release or system component, when deploying a system, and when the system is in commercial operation.

Approaches described in the Background section could be pursued, but are not necessarily approaches that have been previously conceived or pursued. Therefore, unless otherwise indicated herein, the approaches described in the Background section are not prior art to the inventive embodiments disclosed in this application and are not admitted to be prior art by inclusion in the Background section. Therefore, any description contained in the Background section may be moved to the Detailed Description section.

SUMMARY

Example methods, nodes, and systems are operable for reporting channel state information (CSI) in a wireless device in a wireless communication network. Methods may include generating, at the wireless device, a CSI report for transmission to a network node that uses the CSI report to make a scheduling decision, dividing the CSI report into a first CSI report portion and a second CSI report portion, the first CSI report portion including a first payload of data and the second CSI report portion including a second payload of data that is less than the first payload of data, transmitting the first CSI report portion on a transmission time interval (TTI) channel having a first time interval value, and transmitting the second CSI report portion on a short TTI (sTTI) channel having a second time interval value that is less than the first time interval value, wherein the first CSI report portion and the second CSI report portion comprise data that is combined to construct the CSI report.

In some embodiments, the sTTI comprises a plurality of sTTIs and the method further includes splitting the second CSI report portion into at least two groups and transmitting each of the at least two groups corresponding to the second CSI report portion on different ones of the plurality of sTTIs.

In some embodiments, the first CSI report portion is transmitted on two TTI channels that are temporally divided from one another by a given number of frames and the second CSI report portion includes updated and/or complementary information that is transmitted in the given number of frames that are between the two TTI channels.

Some embodiments provide that the first time interval value is at least 1 millisecond and the second time interval value is less than half of the first time interval value. In some embodiments, the CSI report includes at least one of rank indication (RI), precoder matrix indication (PMI) and channel-quality indication (CQI). Some embodiments provide that the CQI and the RI are transmitted via the sTTI channel and the PMI is transmitted via the TTI channel. In some embodiments, the CQI is transmitted via the sTTI channel and the PMI and the RI are transmitted via the TTI channel.

In some embodiments, the CQI includes a shortened CQI (sCQI) that is configured to be transmitted aperiodically over a shortened PUSCH (sPUSCH) in response to receiving a trigger for CSI reporting over a shortened PDCCH (sPDCCH). Some embodiments provide that the CSI includes a shortened CSI (sCSI) that is transmitted on sPUCCH responsive to receiving a request on sPDCCH using a shortened downlink control information (sDCI). In some embodiments, information in the sCSI report that is transmitted on the sTTI channel is necessary for interpreting information in the first CSI portion that is transmitted on the TTI.

In some embodiments, the sCSI report includes an updated CQI value that corresponds to the PMI in the first CSI report portion that is transmitted in the TTI channel. Some embodiments provide that the sCQI report includes a differential CQI value that is configured to be added to the CQI value in the first CSI report portion transmitted on the TTI to obtain an updated CQI value. In some embodiments, the first CSI report portion includes a first information amount and the second CSI report portion includes a second information amount that is less than the first information amount.

In some embodiments, the TTI channel and the sTTI channel use a same transmission mode. Some embodiments provide that the TTI channel and the sTTI channel use different transmission modes relative to one another and that the first CSI report portion includes sets of parameters that are different from those in the second CSI report portion. Some embodiments include determining a transmission mode responsive to receiving an indication in a DCI. In some embodiments, a first transmission mode is maintained for the TTI and a second transmission mode is maintained for the sTTI.

Some embodiments disclosed herein include methods of operating a network node in a wireless communication network. Such methods may include receiving a first CSI report portion that includes a first payload of data on a transmission time interval (TTI) channel having a first time interval value, receiving a second CSI report portion having a second payload of data that is less than the first payload of data on a short TTI (sTTI) channel having a second time interval value that is less than the first time interval value, and constructing a CSI report using the first CSI report portion that was received on the TTI channel and the second CSI report portion that was received on the sTTI channel.

In some embodiments, the sTTI includes multiple sTTIs and the method further includes receiving at least two groups of the second CSI report portion on different ones of the plurality of sTTIs. Some embodiments provide that the first CSI report portion is received on two TTI channels that are temporally divided from one another by a given number of frames and the second CSI report includes updated and/or complementary information that is received in the given number of frames that are between the two TTI channels. In some embodiments, the first time interval value is at least 1 millisecond and the second time interval value is less than half of the first time interval value. Some embodiments provide that the CSI report includes at least one of rank indication (RI), precoder matrix indication (PMI) and channel-quality indication (CQI) and that the CQI and the RI are received via the sTTI channel and the PMI is received via the TTI channel. In some embodiments, the CQI is received via the sTTI channel and the PMI and the RI are received via the TTI channel.

Some embodiments include sending a trigger for CSI reporting over a shortened PDCCH (sPDCCH). In some embodiments, the CQI includes a shortened CQI (sCQI) that is configured to be received aperiodically over a shortened PUSCH (sPUSCH) corresponding to sending the trigger for CSI reporting. Some embodiments include sending a request on sPDCCH using a shortened downlink control information (sDCI). In some embodiments, the CSI includes a shortened CSI (sCSI) that is received on sPUCCH responsive to sending the request on sPDCCH. In some embodiments, information in the sCSI report that is received on the sTTI channel is necessary for interpreting information in the first CSI report portion that is received on the TTI.

Some embodiments provide that the sCSI report includes an updated CQI value that corresponds to the PMI in the first CSI report portion that is received in the TTI channel. In some embodiments, the sCQI report includes a differential CQI value that is configured to be added to the CQI value in the first CSI report portion received on the TTI to obtain an updated CQI value. Some embodiments provide that the first CSI report portion includes a first information amount and the second CSI report portion includes a second information amount that is less than the first information amount.

In some embodiments, the TTI channel and the sTTI channel use a same transmission mode. Some embodiments provide that the TTI channel and the sTTI channel use different transmission modes relative to one another and that the first CSI report portion includes sets of parameters that are different from those in the second CSI report portion.

Some embodiments are directed to computer program products comprising a non-transitory computer readable medium storing program code that when executed by a processor of a wireless device causes the wireless device to perform operations described herein.

Some embodiments are directed to computer program products comprising a non-transitory computer readable medium storing program code that when executed by a processor of a network node causes the wireless device to perform operations described herein.

Some embodiments are directed to a UE adapted to perform operations described herein.

Some embodiments are directed to a radio communication network that includes a first radio node that includes a transceiver to provide wireless communication over a radio interface, at least one processor coupled to the transceiver, and at least one memory coupled to the at least one processor and storing program code that when executed by the at least one processor causes the at least one processor to perform operations including generating, at the wireless device, a CSI report for transmission to a network node that uses the CSI report to make a scheduling decision, dividing the CSI report into a first CSI report portion and a second CSI report portion, the first CSI report portion including a first payload of data and the second CSI report portion including a second payload of data that is less than the first payload of data, transmitting the first CSI report portion on a transmission time interval (TTI) channel having a first time interval value and transmitting the second CSI report portion on a short TTI (sTTI) channel having a second time interval value that is less than the first time interval value, wherein the first CSI report portion and the second CSI report portion comprise data that is combined to construct the CSI report.

Some embodiments are directed to a wireless communication device (UE) that includes a transceiver to provide wireless communication over a radio interface, at least one processor coupled to the transceiver, and at least one memory coupled to the at least one processor and storing program code that when executed by the at least one processor causes the at least one processor to perform operations comprising generating, at the wireless device, a CSI report for transmission to a network node that uses the CSI report to make a scheduling decision, dividing the CSI report into a first CSI report portion and a second CSI report portion, the first CSI report portion including a first payload of data and the second CSI report portion including a second payload of data that is less than the first payload of data, transmitting the first CSI report portion on a transmission time interval (TTI) channel having a first time interval value, and transmitting the second CSI report portion on a short TTI (sTTI) channel having a second time interval value that is less than the first time interval value, wherein the first CSI report portion and the second CSI report portion comprise data that is combined to construct the CSI report.

Some embodiments are directed to a computer program product including a computer readable storage medium having computer readable code embodied in the computer readable storage medium that when executed by a processor of a wireless communication device causes the wireless communication device to perform operations including generating, at the wireless device, a CSI report for transmission to a network node that uses the CSI report to make a scheduling decision, dividing the CSI report into a first CSI report portion and a second CSI report portion, the first CSI report portion including a first payload of data and the second CSI report portion including a second payload of data that is less than the first payload of data, transmitting the first CSI report portion on a transmission time interval (TTI) channel having a first time interval value, and transmitting the second CSI report portion on a short TTI (sTTI) channel having a second time interval value that is less than the first time interval value, wherein the first CSI report portion and the second CSI report portion comprise data that is combined to construct the CSI report.

Some embodiments are directed to a computer program product including a computer readable storage medium having computer readable code embodied in the computer readable storage medium that when executed by a processor of a wireless communication device causes the wireless communication device to perform operations including receiving a first CSI report portion that includes a first payload of data on a transmission time interval (TTI) channel having a first time interval value, receiving a second CSI report portion having a second payload of data that is less than the first payload of data on a short TTI (sTTI) channel having a second time interval value that is less than the first time interval value, and constructing a CSI report using the first CSI report portion that was received on the TTI channel and the second CSI report portion that was received on the sTTI channel.

Some embodiments are directed to a network node including a CSI report generating module that is configured to generate a CSI report for transmission to a network node that uses the CSI report to make a scheduling decision, a CSI report dividing module that is configured to divide the CSI report into a first CSI report portion and a second CSI report portion, the first CSI report portion including a first payload of data and the second CSI report portion including a second payload of data that is less than the first payload of data, a first CSI report portion transmitting module that is configured to transmit the first CSI report portion on a transmission time interval (TTI) channel having a first time interval value, and a second CSI report portion transmitting module that is configured to transmitting the second CSI report portion on a short TTI (sTTI) channel having a second time interval value that is less than the first time interval value, wherein the first CSI report portion and the second CSI report portion comprise data that is combined to construct the CSI report.

Some embodiments are directed to a network node comprising a first CSI report portion receiving module that is configured to receive a first CSI report portion that includes a first payload of data on a transmission time interval (TTI) channel having a first time interval value, a second CSI report portion receiving module that is configured to receive a second CSI report portion having a second payload of data that is less than the first payload of data on a short TTI (sTTI) channel having a second time interval value that is less than the first time interval value, and a CSI report constructing module that is configured to construct a CSI report using the first CSI report portion that was received on the TTI channel and the second CSI report portion that was received on the sTTI channel.

BRIEF DESCRIPTION OF THE DRAWINGS

The drawings illustrate selected embodiments of the disclosed subject matter. In the drawings, like reference labels denote like features.

FIG. 13 illustrates a radio access node according to some embodiments disclosed herein.

DETAILED DESCRIPTION

Figure 1:
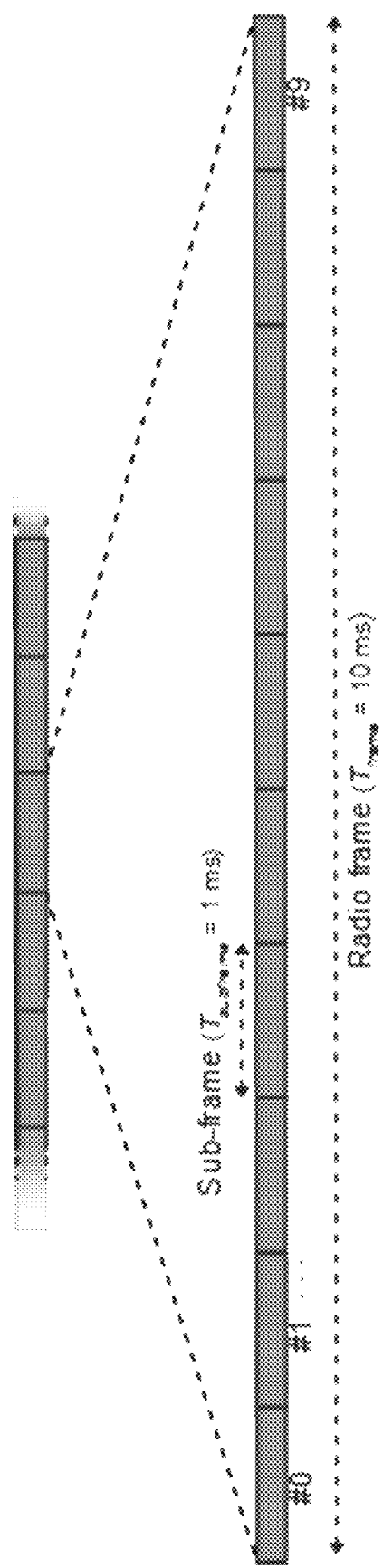
FIG. 1 illustrates the LTE time-domain structure.
Figure 2:
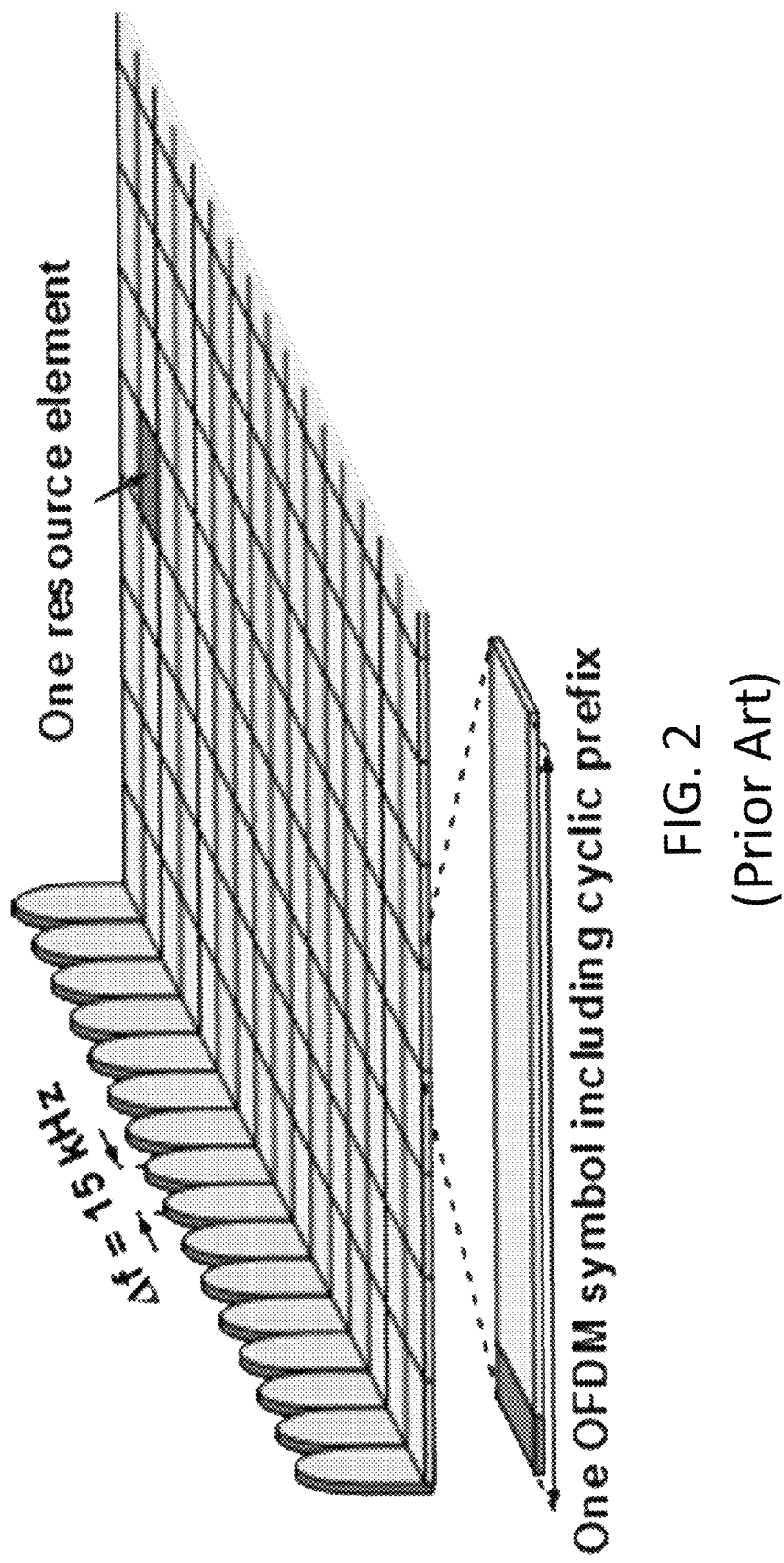
FIG. 2 illustrates the LTE downlink physical resource.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment. Any two or more embodiments described below may be combined in any way with each other. Moreover, certain details of the described embodiments may be modified, omitted, or expanded upon without departing from the scope of the described subject matter.

Note that terminology such as base station, 5G base station, NR base station, NodeB, gNode B or eNode B and UE should be considering non-limiting and does in particular not imply a certain hierarchical relation between the two; in general, "NodeB" could be considered as device 1 and "UE" device 2, and these two devices communicate with each other over some radio channel. A generic term network node is used in some embodiments. The network node can be a base station, access point, RRH, RRU, radio network node, gNodeB, transmission reception point (TRP), NodeB or eNode B a core network node (e.g., MME, SON node, positioning node, MDT node, MCE, MBMS node etc). A generic term wireless device is used in some embodiments. The wireless device can be any type of UE such as LTE UE, NB-IoT UE, M2M UE, V2V UE, V2X UE, UE of particular category (e.g. UE category NB1, UE category M1, UE category 0 etc) etc. A generic term radio node used herein may be a network node or a wireless device.

In some embodiments, a term operating bandwidth (BW) is used. Over the operating BW the network node transmits to and/or receives signal from one or more UEs in a cell. The operating bandwidth is interchangeably called as channel bandwidth, system bandwidth, transmission bandwidth, cell bandwidth, cell transmission BW, carrier bandwidth etc. The operating BW may be expressed in different units. Examples of units are KHz, MHz, number of resource blocks, number of resource elements, number of subcarriers, number of physical channels, number of frequency resource units etc.

The frequency channel or carrier frequency over which a RAT operates is enumerated or addressed by a channel number aka absolute radio frequency channel number (ARFCN) e.g. E-UTRA ARFCN (EARFCN) in LTE etc.

In some embodiments signal is used can be an uplink (UL) signal, a downlink (DL) signal or a sidelink (SL) signal. An uplink signal, which is transmitted by the wireless device, can be a physical signal or a physical channel. Examples of uplink physical signal are SRS, DMRS etc. Examples of uplink physical channel are PUCCH, PUSCH, NPUSCH, NPUCCH, PRACH, NPRACH etc. A DL signal, which is transmitted by the network node, can be a physical signal or a physical channel. Examples of DL physical signal are CRS, DMRS, PRS, CSI-RS etc. Examples of downlink physical channels are PDCCH, PDSCH, NPDSCH, NPDCCH, PMCH etc. A sidelink (SL) signal, which is transmitted by a UE capable of direct UE to UE operation (aka D2D operation, V2V operation etc), can be a physical signal or a physical channel Examples of SL physical signal are SLSS, DMRS etc. Examples of SL physical channel are PSSCH, PSCCH, PSDCH, PSBCH etc.

The term "numerology" used herein may refer to any one or more attributes defining signal characteristics. Examples of such attributes are: subcarrier spacing, symbol duration, CP duration (aka CP length), time slot duration, subframe duration, number of subcarriers per physical channel, number of physical channels within the bandwidth, etc. A physical channel used herein refers to any time-frequency radio resource. Examples of physical channels are resource block (RB), physical RB (PRB), virtual RB (VRB) etc.

The term "time resource" used herein may correspond to any type of physical resource or radio resource expressed in terms of length of time. Examples of time resources are: symbol, time slot, subframe, short subframe, mini-slot, radio frame, TTI, interleaving time, etc.

The term FeMBSFN subframe may comprise, e.g., an MBSFN subframes configured according to eMBMS enhancements described in Section 2.1.1.1 (e.g., with new numerology, 1.25 kHz subcarrier spacing, in subframe #0, #4, #5, #9, etc.). The term mixed cell unicast/FeMBSFN subframes may comprise e.g. a cell transmitting one or more FeMBSFN subframes and one or more subframe with at least unicast data or PDSCH.

As used herein, a "radio node" is either a radio access node or a wireless device.

As used herein, a "radio access node" is any node in a radio access network of a cellular communications network that operates to wirelessly transmit and/or receive signals. Some examples of a radio access node include, but are not limited to, a base station (e.g., an enhanced or evolved Node B (eNB) in a Third Generation Partnership Project (3GPP) Long Term Evolution (LTE) network), a high-power or macro base station, a low-power base station (e.g., a micro base station, a pico base station, a home eNB, or the like), and a relay node.

As used herein, a "core network node" is any type of node in a Core Network (CN). Some examples of a core network node include, e.g., a Mobility Management Entity (MME), a Packet Data Network (PDN) Gateway (P-GW), a Service Capability Exposure Function (SCEF), or the like.

As used herein, a "wireless device" is any type of device that is capable of wirelessly transmitting and/or receiving signals to/from another wireless device or to/from a network node in a cellular communications network to obtain has access to (i.e., be served by) the cellular communications network. Some examples of a wireless device include, but are not limited to, a User Equipment device (UE) in a 3GPP network, a Machine Type Communication (MTC) device, an NB-IoT device, an FeMTC device, etc.

As used herein, a "network node" is any node that is used and can correspond to any type of radio network node or any network node, which communicates with a UE and/or with another network node. Examples of network nodes are NodeB, MeNB, SeNB, a network node belonging to MCG or SCG, base station (BS), multi-standard radio (MSR) radio node such as MSR BS, eNodeB, network controller, radio network controller (RNC), base station controller (BSC), relay, donor node controlling relay, base transceiver station (BTS), access point (AP), transmission points, transmission nodes, RRU, RRH, nodes in distributed antenna system (DAS), core network node (e.g. MSC, MME, etc.), O&M, OSS, SON, positioning node (e.g. E-SMLC), MDT, etc.

As used herein, the non-limiting term user equipment (UE) is used and it refers to any type of wireless device communicating with a network node and/or with another UE in a cellular or mobile communication system. Examples of UE are target device, device to device (D2D) UE, machine type UE or UE capable of machine to machine (M2M) communication, PDA, PAD, Tablet, mobile terminals, smart phone, laptop embedded equipped (LEE), laptop mounted equipment (LME), USB dongles, ProSe UE, V2V UE, V2X UE, etc.

As used herein, the non-limiting term WAN (wireless access network or RAN, radio access network) node can be a UE or a network node (e.g. access point, BS etc.) The WAN node may be interchangeably called as cellular node, NW source node etc.

Shorter latency than previous generations of 3GPP RATs was one performance metric that guided the design of Long Term Evolution (LTE). End-users may now recognize LTE to be a system that provides faster access to internet and lower data latencies than previous generations of mobile radio technologies.

Packet data latency is important not only for the perceived responsiveness of the system; it is also a parameter that indirectly influences the throughput of the system. HTTP/TCP is the dominating application and transport layer protocol suite used on the internet today. According to the HTTP Archive (http://httparchive.org/trends.php) the typical size of HTTP based transactions over the internet are in the range of a few 10's of Kbyte up to 1 Mbyte. In this size range, the TCP slow start period is a significant part of the total transport period of the packet stream. During TCP slow start the performance is latency limited. Hence, improved latency can rather easily be showed to improve the average throughput, for this type of TCP based data transactions.

Latency reductions may positively impact radio resource efficiency. Lower packet data latency may increase the number of transmissions possible within a certain delay bound; hence higher Block Error Rate (BLER) targets could be used for the data transmissions freeing up radio resources potentially improving the capacity of the system.

One approach to latency reduction is the reduction of transport time of data and control signaling by addressing the length of a transmission time interval (TTI). By reducing the length of a TTI and maintaining the bandwidth, the processing time at the transmitter and the receiver nodes is also expected to be reduced, due to less data to process within the TTI. As described herein, in LTE release 8, a TTI corresponds to one subframe (SF) of length 1 millisecond. One such 1 ms TTI is constructed by using 14 OFDM or SC-FDMA symbols in the case of normal cyclic prefix and 12 OFDM or SC-FDMA symbols in the case of extended cyclic prefix. In LTE release 14 in 3GPP, a study item on latency reduction has been conducted, with the goal of specifying transmissions with shorter TTIs, such as a slot or a few symbols.

An sTTI can be decided to have any duration in time and comprise resources on any number of OFDM or SC-FDMA symbols, and start at any symbol position within the overall frame. For the work in LTE, one focus may be to only allow the sTTIs to start at fixed positions with durations of either 2, 3, 4 or 7 symbols. Furthermore, the sTTI may not be allowed to cross either slot or subframe boundaries.

Figure 5:
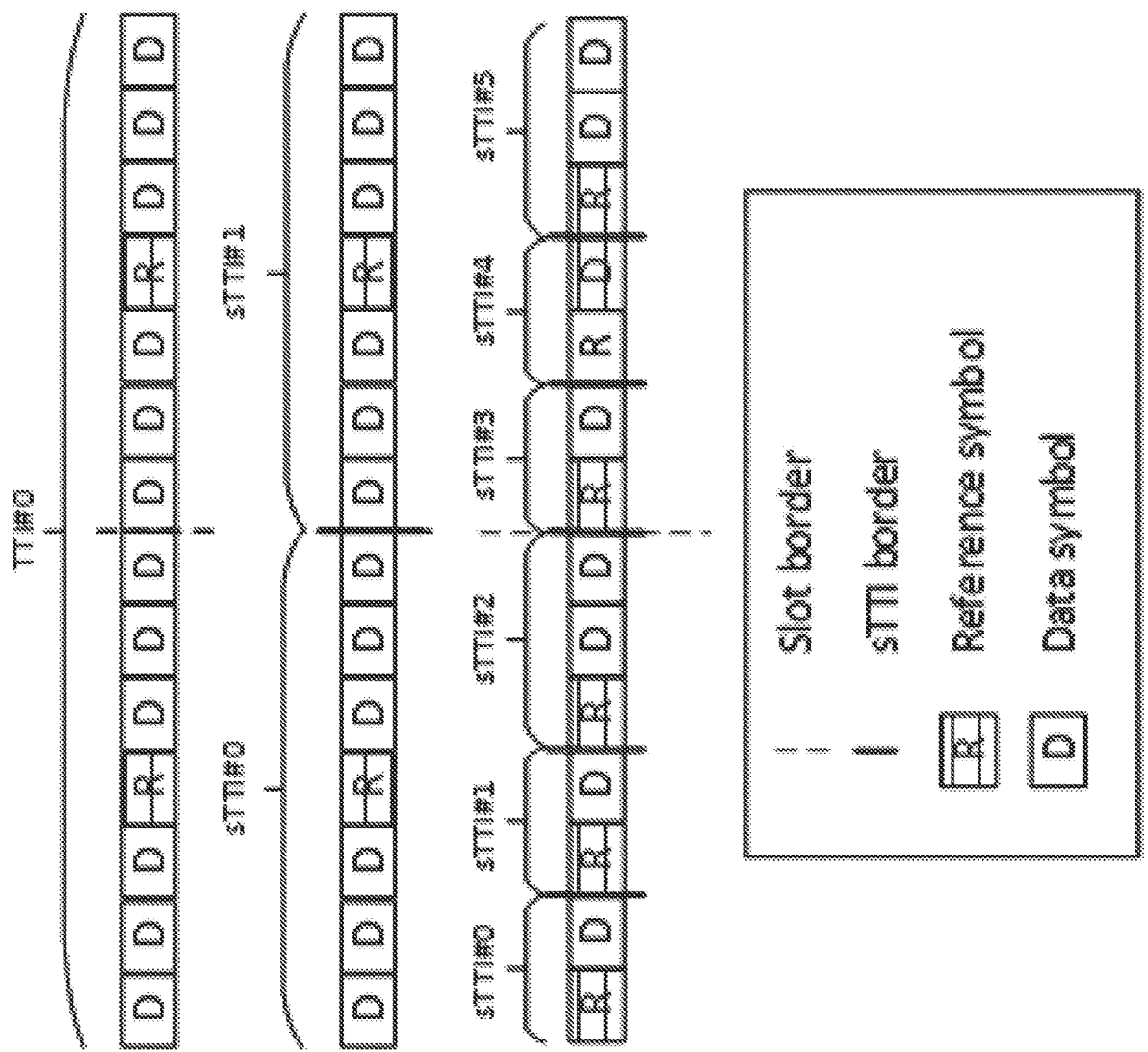
FIG. 5 illustrates an example of a ⅔-symbol sTTI configuration with an uplink subframe.

Brief reference is now made to FIG. 5, which illustrates an example of a ⅔-symbol sTTI configuration with an uplink subframe. Specifically, FIG. 5 illustrates an example in which the duration of the uplink short TTI is 0.5 ms, i.e. seven SC-FDMA symbols for the case with normal cyclic prefix. Also, a combined length of 2 or 3 symbols are shown for the sTTI. Here, the "R" in the figures indicate the DMRS symbols, and "D" indicate the data symbols. Other configurations may not be excluded, and the figure is only an attempt to illustrated differences in sTTI lengths.

In order to secure a reliable downlink transmission, the network relies on acquired knowledge of the channel condition prior to transmission. The set of indicators used to secure that knowledge is referred to as channel state information (CSI). The UE is therefore providing CSI reports to the network, which uses this reports as input to make its scheduling decision.

CSI reporting includes different types of information subject to the downlink transmission mode. In the simplest downlink configuration, there is no need of spatial information feedback and thus, only CQI may be transmitted. For MIMO transmissions, CQI may be complemented with PMI, RI and/or CRI depending of the MIMO configuration. The length of the report can be from 1 subframe in a PUCCH/PUSCH transmission to several subframes for larger reports (e.g. TM10 reports for class B CSI take 3 subframes).

CSI can be reported periodically or in response to aperiodic triggers. Its periodicity may typically be larger than a subframe (1 ms), e.g. a typical value for the CSI periodicity in FD-MIMO may be 5 ms. Even larger periodicities are seen when the UE is not having any traffic but its CSI is monitored.

The channel-state reports may include one or more of rank indication (RI), precoder matrix indication (PMI), and/or channel-quality indication (CQI). RI may provide a recommendation on the transmission rank to use and/or the number of layers that should preferably be used for downlink transmission to the terminal. RI only needs to be reported by terminals that are configured to be in one of the spatial-multiplexing transmission modes. There is at most one RI reported, valid across the full bandwidth. In this regard, the RI is frequency non-selective since all layers are transmitted on the same set of resource blocks in LTE.

PMI indicates which of the precoder matrices should preferably be used for the downlink transmission. The reported precoder matrix may be determined assuming the number of layers indicated by the RI. The precoder recommendation may be frequency selective. In this regard, the terminal may recommend different precoders for different parts of the downlink spectrum. Furthermore, the network can restrict the set of matrices from which the terminal should select the recommended precoder, which may be referred to as codebook subset restriction, to avoid reporting precoders that are not useful in the antenna setup used.

CQI represents the highest modulation-and-coding scheme that, if used, would mean PDSCCH transmissions (using the recommended RI and PMI) were received with a block-error rate of at most 10%. The CQI may be used as a feedback quantity instead of, for example, the signal-to-noise ratio, to account for different receiver implementation in the terminal. Also, basing the feedback reports on CQI instead of signal-to-noise ratio may simplify the testing of terminals. For example, a terminal delivering data with more than 10% block-error probability when using the modulation-and-coding scheme indicated by the CQI would fail the test. Multiple CQI reports, each representing the channel quality in a certain part of the downlink spectrum, can be part of a channel-state report.

Together, a combination of the RI, PMI, and CQI forms a channel-state report. In LTE systems, the content included in a channel-state report may depend on the reporting mode corresponding to the terminal configuration. For example, RI and PMI do not need to be reported unless the terminal is in a spatial multiplexing transmission mode. The content of the CSI report may thus depend on the transmission mode, which decides of what type of CSI is reported (CQI, RI, PMI and combination thereof) and the CSI reporting mode, which decides on the details of the reported CSI, such as the periodicity and bandwidth validity of the report.

Each part of the CSI report may answer a specific question. CQI is an index that gives a recommendation on modulation and coding schemes (MCS) to be used during scheduling. PMI relates to the type of spatial precoding while RI signals the amount of measured and available spatial layers.

The framework may be built around two types of CSI reports, namely aperiodic and periodic reports, which are different in terms of how a report is triggered. Aperiodic channel-state reports are delivered when explicitly requested by the network by means of the channel-state-request flag included in uplink scheduling grants. An aperiodic channel-state report is always delivered using the PUSCH—that is, on a dynamically assigned resource. Periodic channel-state reports are configured by the network to be delivered with a certain periodicity, possibly as often as once every 2 ms, on a semi-statically configured PUCCH resource. However, similar to hybrid-ARQ acknowledgements normally delivered on PUCCH, channel state reports may be "re-routed to" or "piggy-backed on" the PUSCH if the terminal has a valid uplink grant and is anyway to transmit on the PUSCH.

Although both provide estimates on the channel conditions, the aperiodic and periodic reports differ in terms of their detailed contents and the usage. In general, aperiodic reports may be larger and more detailed than their periodic counterparts.

A typical use of periodic and aperiodic reporting is to configure lightweight periodic CSI reporting on PUCCH, for example to provide feedback of the wideband CQI and no PMI information (mode 1-0). Upon arrival of data to transmit in the downlink to a specific terminal, aperiodic reports could be requested as needed, for example with frequency-selective CQI and PMI (mode 3-1). Aperiodic triggered transmission can be configured in between periodic transmissions.

Periodic reports are configured by the network to be delivered with a certain periodicity. The configuration is done via RRC signaling and thus may be semi-static. The reports are delivered via the PUCCH channel. The limited, compared to PUSCH, payload supported on the PUCCH also implies that the different types of information in a periodic report may not be possible to transmit in a single subframe. Therefore, some of the reporting modes will transmit one or several of the wideband CQI, the wideband CQI including PMI, the RI, and the CQI for the UE-selected sub-bands at different time points. Furthermore, the RI can typically be reported less often, compared to the reporting of PMI and CQI, reflecting the fact that the suitable number of layers may vary on a slower basis, compared to the channel variations that impact the choice of precoder matrix and modulation rate, and coding scheme.

Two periodic reporting modes are supported in LTE and may include different submodes. These periodic reporting modes include wideband reports and UE-selected reports. Wideband reports reflect the average channel quality across the entire cell bandwidth with a single CQI value. If PMI reporting is enabled, a single PMI valid across the full bandwidth is reported. For UE-selected reports, the total bandwidth (of a component carrier) may be divided into one to four bandwidth parts, with the number of bandwidth parts obtained from the cell bandwidth. For each bandwidth part, the terminal selects the best sub-band within that part. The sub-band size may range from four to eight resource blocks. Since the supported payload size of the PUCCH is limited, the reporting cycles through the bandwidth parts and in one subframe report the wideband CQI and PMI (if enabled) for that bandwidth part, as well as the best sub-band and the CQI for that sub-band. The RI (if enabled) is reported in a separate subframe.

The different periodic reporting modes are summarized in Table 1 provided below. Note that all PMI reporting, if enabled, may be of a wideband type. There is no support for frequency-selective PMI in periodic reporting, as the quantity of bits would result in a too large overhead.

TABLE 1

| | Reporting Mode | | | | | | | | |
|---|---|---|---|---|---|---|---|---|---|
| | Wideband CQI | | | Frequency-Selective CQI | | | | | |
| | | | | UE-Selected Sub-bands | | | Conf. Sub-bands | | |
| Transmission Mode | 1-0: No PMI | 1-1: Wideband PMI | 1-2: Selective PMI | 2-0: No PMI | 2-1: Wideband PMI | 2-2: Selective PMI | 3-0: No PMI | 3-1: Wideband PMI | 3-2: Selective PMI |
| 1 Single antenna, CRS | • | | | • | | | | | |
| 2 Transmit diversity | • | | | • | | | | | |
| 3 Open-Loop Spatial mux | • | | | • | | | | | |

TABLE 1-continued

| | Reporting Mode | | | | | | | | |
| | Wideband CQI | | | Frequency-Selective CQI | | | | | |
| | | | | UE-Selected Sub-bands | | | Conf. Sub-bands | | |
| Transmission Mode | 1-0: No PMI | 1-1: Wideband PMI | 1-2: Selective PMI | 2-0: No PMI | 2-1: Wideband PMI | 2-2: Selective PMI | 3-0: No PMI | 3-1: Wideband PMI | 3-2: Selective PMI |
|---|---|---|---|---|---|---|---|---|---|
| 4 Closed loop spatial mux | | • | | | • | | | | |
| 5 Multi-user MIMO | | • | | | • | | | | |
| 6 Codebook-based beam-form | | • | | | • | | | | |
| 7 Single-layer trans., DM-RS | • | | | • | | | | | |
| 8 Dual-layer trans., DM-RS | •10 | •10 | | •10 | •10 | | | | |
| 9 Multi-layer trans., DM-RS | •10 | •10 | | •10 | •10 | | | | |
| 10 Multi-layer trans., DM-RS | •11 | •11 | | •11 | •11 | | | | |

Three aperiodic reporting modes are supported in LTE, where each mode has several submodes depending on the configuration. These reporting modes include wideband reports, UE-selected reports, and network configured reports. Wideband reports reflect the average channel quality across the entire cell bandwidth with a single CQI value. Despite a single average CQI value being provided for the whole bandwidth, the PMI reporting is frequency selective. Frequency-selective reporting is obtained, for reporting purposes only, by dividing the overall downlink bandwidth (of each component carrier) into a number of equally sized sub-bands, where each sub-band consists of a set of consecutive resource blocks.

The size of a sub-band, ranging from four to eight resource blocks, depends on the cell bandwidth. The PMI is then reported for each sub-band. For transmission modes supporting spatial multiplexing, the CQI and the PMI are calculated assuming the channel rank indicated by the RI, otherwise rank-1 is assumed. Wideband reports are smaller than their frequency-selective counterparts, but obviously do not provide any information about the frequency domain.

For UE selected reports, the terminal selects the best M sub-bands, reports in addition to the indices of the selected sub-bands, one CQI reflecting the average channel quality over the selected M sub-bands together with one wideband CQI reflecting the channel quality across the full downlink carrier bandwidth. This type of report thus provides frequency-domain information about the channel conditions. The sub-band size, ranging from two to four resource blocks, and the value of M, ranging from 1 to 6, depends on the downlink carrier bandwidth. Depending on the transmission mode configured, the PMI and RI are also provided as part of this type of report.

For network configured reports, the network configures the set of sub-bands that the terminal should generate reports for. The terminal reports one wideband CQI reflecting the channel quality across the full downlink carrier bandwidth and one CQI per configured sub-band. The sub-band size depends on the downlink carrier bandwidth and is in the range of four to eight resource blocks. Depending on the transmission mode configured, the PMI and RI are also provided as part of this type of report. The different aperiodic reporting modes are summarized in Table 2 below:

TABLE 2

| | Reporting Mode | | | | | | | | |
| | Wideband CQI | | | Frequency-Selective CQI | | | | | |
| | | | | UE-Selected Sub-bands | | | Conf. Sub-bands | | |
| Transmission Mode | 1-0: No PMI | 1-1: Wideband PMI | 1-2: Selective PMI | 2-0: No PMI | 2-1: Wideband PMI | 2-2: Selective PMI | 3-0: No PMI | 3-1: Wideband PMI | 3-2: Selective PMI |
|---|---|---|---|---|---|---|---|---|---|
| 1 Single antenna, CRS | •13 | | | • | | | • | | |

TABLE 2-continued

| | Reporting Mode | | | | | | | | |
|---|---|---|---|---|---|---|---|---|---|
| | Wideband CQI | | | Frequency-Selective CQI | | | | | |
| | | | | UE-Selected Sub-bands | | | Conf. Sub-bands | | |
| Transmission Mode | 1-0: No PMI | 1-1: Wideband PMI | 1-2: Selective PMI | 2-0: No PMI | 2-1: Wideband PMI | 2-2: Selective PMI | 3-0: No PMI | 3-1: Wideband PMI | 3-2: Selective PMI |
| 2 Transmit diversity | •13 | | | • | | | • | | |
| 3 Open-Loop Spatial mux | •13 | | | • | | | • | | |
| 4 Closed loop spatial mux | | •13 | • | | | • | | • | •12 |
| 5 Multi-user MIMO | | •13 | | | | | | • | |
| 6 Codebook-based beam-form | | •13 | • | | | • | | • | •12 |
| 7 Single-layer trans., DM-RS | •13 | | | • | | | • | | |
| 8 Dual-layer trans., DM-RS | •13 | •13 | •10 | •10 | | •10 | •10 | •10 | •12 |
| 9 Multi-layer trans., DM-RS | •13 | •13 | •10 | •10 | | •10 | •10 | •10 | •12 |
| 10 Multi-layer trans., DM-RS | •13 | •13 | •11 | •11 | | •11 | •11 | •11 | •12 |

In some embodiments disclosed herein, concepts from the legacy CSI framework are introduced and adapted into the sTTI so that the system can benefit from faster adaptation to channel condition. For example, specifically, a short TTI channel quality information report (sCQI) is introduced. As used herein, data transmitted and/or received at a TTI and/or a sTTI may be referred to as being transmitted and/or received using a TTI channel and/or sTTI channel.

Certain embodiments are presented in recognition of shortcomings associated with conventional techniques and technologies, such as the following examples. The current framework is built for 1 ms TTI transmission and thus is too heavy to be supported as it is by short TTI. While the 1 ms CSI framework may be used to report the CSI while using sTTI for the data traffic, the fast changing elements of the channel state would not be captured, and therefore the sTTI benefit of fast adaptability to channel condition would not be realized. Moreover, the latency of the legacy CSI feedback may adversely impact the sTTI data channel performance.

Some embodiments disclosed herein may provide potential benefits compared to conventional techniques and technologies. For example, some embodiments provide that the CSI reports are available at the eNodeB at rates comparable to the new low latency offered by sTTI.

Some embodiments may utilize a mix of PUSCH and PUCCH transmission for aperiodic and periodic reporting. For simple transmission modes, only CQI is reported. However, for the new FD-MIMO methods, the CSI transmission can take up to 3 PUCCH transmissions to send RI, PMI and CQI. PMI can be done in two transmissions for MIMO as it is built using two matrices that are reported with two PMI components, i1 and i2 for the first and second matrix, respectively. Sending all this CSI information on the UL sTTI channel may result in a high CSI overhead for a short TTI and a large payload that may degrade the link performance of the short TTI UL channels as less resources become available for actual PUSCH data transmission. Some embodiments split the CSI information in two groups where one group is reported on a 1 ms TTI channel and one group is reported on sTTI channels. The eNB can construct a full CSI report based on the partial information received on the UL channels of different TTI lengths.

Splitting sTTI related CSI information into two groups may be advantageous when the CSI information to report is large. This may depend on the configured CSI reporting type and/or the transmission mode (e.g. MIMO or SIMO). In some embodiments, the TTI on which CSI feedback is reported for DL sTTI related transmissions may be determined by the configured transmission mode and/or the configured CSI reporting type. CSI feedback for short TTI is reported only on short TTI channels for specific transmission modes and/or specific CSI reporting types. One example includes the CSI reporting type or the transmission mode that requires only a low payload CQI feedback. For other transmission modes, CSI feedback for short TTI may be obtained from a combination of CSI information sent by the UE on 1 ms TTI channels and CSI information sent by the UE sent on sTTI channels.

In some embodiments, two CSI feedback loops may be used. When the CSI payload to report is large, it may be beneficial to split the CSI information in two groups where one group is reported on 1 ms TTI channel and one group is reported on sTTI channels. For example, some embodiments may report as much as possible on the 1 ms TTI UL channels to limit the payload and overhead on the sTTI UL channels. The CSI information sent on 1 ms TTI can be a full CSI report. Some embodiments provide that the important aspect is that the CSI information sent on sTTI may be a partial report that needs to be combined with the report sent on 1 ms TTI to be interpreted correctly.

Figure 6:
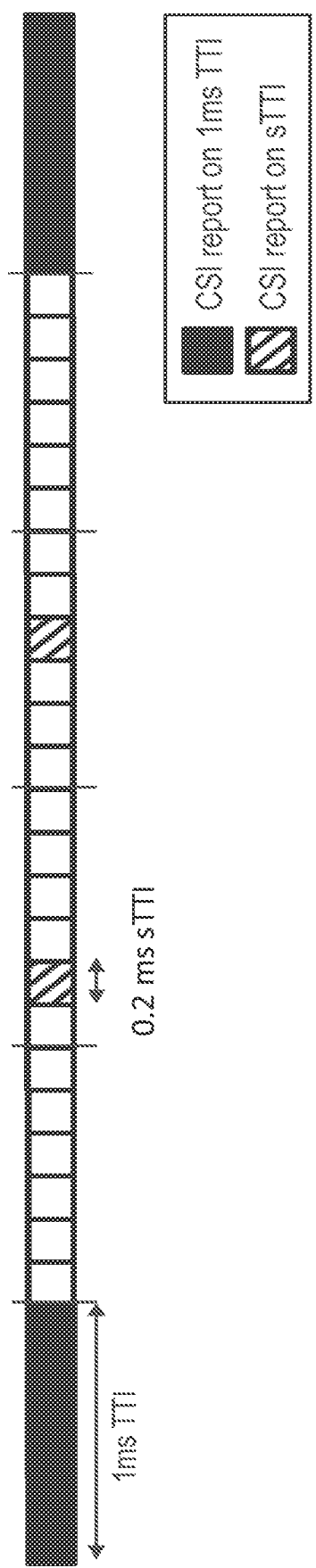
FIG. 6 illustrates a concept related to two CSI feedback loops.

Reference is now made to FIG. 6. A full CSI report is configured on a 1 ms TTI and occurs every 5th subframe. This can be an aperiodic or periodic 1 ms TTI CSI report. Complementary and/or updated CSI information may be reported over the sTTI UL channels between two of the 1 ms TTI CSI reports.

In some embodiments, CSI information may be sent on 1 ms TTI and on a 0.2 ms sTTI. Some embodiments provide that spatial information contained in PMI does not need to be sent more frequently than what is already done within the 1 ms TTI framework. Unless a user environment changes extremely fast, the precoder used by the UE and network will be valid for a time longer than an sTTI because the coherence time of typical wireless channels, even with fast moving UEs, may be rarely below 1 ms. Therefore, the PMI feedback can be transmitted over the legacy 1 ms TTI framework when the UE is using the same transmission mode for sTTI and legacy TTI.

In principle, the CSI measurements performed on a TTI are valid and relevant for sTTI scheduling. For example, CSI reporting based on 1 ms TTI may be able to accurately capture the variation of the spatial properties of the channel. No additional gain is expected if PMI is reported more frequently than as on a 1 ms TTI. A such, an eNB can base its scheduling decisions for sTTI on a 1 ms TTI CSI measurement and reporting. As such, spatial information such as PMI/RI measurement and reporting based on a 1 ms TTI are suitable for sTTI scheduling.

CQI may report the available MCS at a given time, which can change rather fast, based on interference condition. As such, having the CQI rate following the sTTI transmission rate could be beneficial, especially if the interference consists of other sTTI users. Accordingly, some embodiments include using aperiodic CQI feedback for sTTI using sPUSCH. Depending on transmission modes, RI could be associated to the sPUSCH transmission according to some embodiments.

In some embodiments, CQI feedback may need between 4 and 8 bits depending on the number of transmitted codewords. Further, the subband differential CQI may use two bits per subband. Given the lower payload in sPUSCH, some embodiments include using differential CQI for wideband CQI and anchoring the measurement to e.g. a full (non differential) measurement every x ms. As such, differential CQI feedback on sPUSCH could be beneficial from the payload point of view.

In another embodiment, CQI and RI are transmitted using the sTTI framework. The remaining part of the CSI reports are CQI and RI. CQI can benefit from higher transmission rate as it provides a picture of the available signal to interference and noise ratio (SINR) at a given instant (which translate to available modulation and coding scheme in the LTE scheduler). sCQI is expected to be sent aperiodically over sPUSCH, but may also be periodically sent over sPUCCH. Since sTTI payload is limited, shortened PUCCH (sPUCCH) transmission of CSI may be avoided and the shortened PUSCH (sPUSCH) may be used for the CSI transmission. CQI and RI reports can be transmitted using the existing coding for CQI and RI. Other portions of this description provide more possibilities on how to code sCQI reports.

In some embodiments, since the rank of the wireless channel typically changes less frequently than the channel realizations themselves, the RI may be updated less frequently or as frequently as the PMI report. Thus, in the present embodiment, the RI may be transmitted using the 1 ms TTI framework along with the PMI, while the CQI alone may be transmitted on the sTTI framework.

The sPUSCH transmission is aperiodic and thus a trigger for CSI reporting must be transmitted in sPDCCH to receive sCSI reports. An aperiodic short TTI CSI or aperiodic sCSI including sCQI and sRI may be transmitted. Some embodiments provide that for periodic reporting sCSI may be supported on PUCCH.

In some embodiments, the sCSI report triggers for CQI and RI reports may be transmitted by sPDCCH using an sDCI. The contents of the sDCI trigger and its interpretation can be configured via RRC. The sCSI report may be transmitted by shortened PUSCH (sPUSCH).

In some embodiments, the sCSI is reported on sPUCCH. The periodicity, content and level of details of the report can be configured via RRC. Some embodiments provide that the information contained in the sCSI report sent on sTTI channels is combined with the information received on a 1 ms TTI CSI report for proper interpretation. For example, if the sCSI report contains updated CQI value, this CQI value relates to a PMI that was reported on the 1 ms TTI CSI report. In some embodiments, the sCSI report contains a differential CQI value that should be added to the CQI value reported on the 1 ms TTI CSI report to obtain the updated CQI value.

In some embodiments, the CSI information reported on the sTTI UL channels may be measured in a different way than the CSI information reported on the 1 ms TTI UL channels. For instance, the CSI information reported on the sTTI UL channels can be measured on a different bandwidth than the CSI information reported on the 1 ms TTI channel. Some embodiments provide that the sub-band CQI report is configured for a UE, i.e. the UE reports a CQI value per sub-band. The sub-band sizes can be larger when the CQI value per sub-band is to be reported on the sTTI UL channels compared to when the CQI value per sub-band is reported on the 1 ms TTI UL channels. This may enable a reduction of the CSI payload of the sTTI report, since the report is sent for fewer sub-bands. This also means that the CQI value per sub-band reported on the sTTI UL channels is measured over a larger bandwidth.

As provided herein, the information in a CSI may be split. For example, the content of an aperiodic CSI for 1 ms TTI LTE may include one of the following 4 cases.

Case 1: Wideband CQI (WCQI), Wideband PMI (WPMI), RI;

Case 2: Wideband CQI, Sub-band PMI (SubPMI), RI;

Case 3: Wideband CQI, Sub-band CQI (SubCQI), Sub-band PMI, RI; and

Case 4: Wideband CQI, Sub-band CQI, Wideband PMI, RI.

Figure 7:
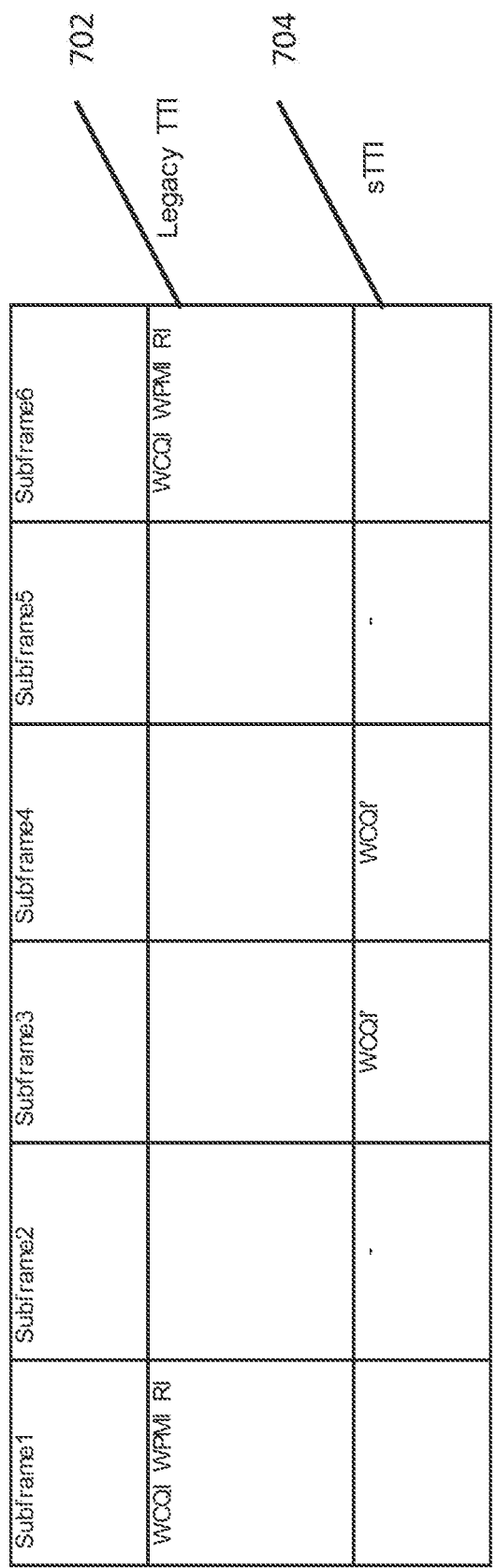
FIG. 7 illustrates splitting the content of CSI information on sTTI and 1 ms TTI according to some embodiments disclosed herein.

For Case 1, brief reference is now made to FIG. 7, which illustrates splitting the content of CSI information on sTTI 704 and 1 ms TTI 702 according to some embodiments disclosed herein. As illustrated, the wideband CQI, wideband PMI and RI are reported on 1 ms TTI 702. To get further refinement of the CSI information, the eNB may configure and/or trigger CSI reporting on a sTTI channel 704 on a faster scale. The report sent on the sTTI channels 704 contains less information than one sent on the 1 ms TTI channel 702. For example, the CSI information may not include the full information and instead only provide an update to the wideband CQI value, WCQI', in form of a difference that is compared to the previously reported value on the 1 ms TTI UL channel 702 or on the sTTI channel 704.

Figure 8:
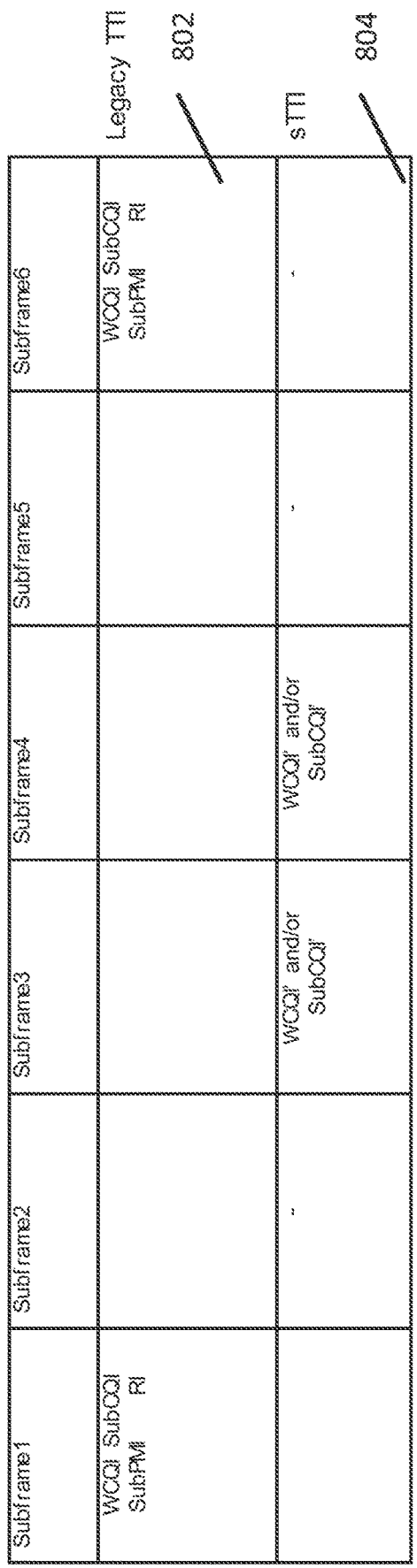
FIG. 8 illustrates splitting the content of CSI information on sTTI and 1 ms TTI according to some embodiments disclosed herein.

For Case 3, brief reference is now made to FIG. 8, which illustrates splitting the content of CSI information on sTTI 804 and 1 ms TTI 802 according to some embodiments disclosed herein. As illstrated, wideband CQI, sub-band PMI and RI are reported on 1 ms TTI 802. To get further refinement of the CSI information, the eNB would configure or trigger CSI reporting on a sTTI channel 804 on a faster scale. The report sent on the sTTI channels 804 contains less information than the one sent on the 1 ms TTI channel 802. For instance, it would contain only an update to the wideband CQI value, WCQI', and/or an update to the sub-band CQI values, SubCQI'. Which of wideband CQI and sub-band CQI should be reported on the sTTI channel 804 can be configured over RRC.

Some embodiments provide that the sTTI and TTI transmission may share the same transmission mode, and that the CSI reports are configured using the legacy configuration elements via RRC. Note that PMI includes precoder indexes (i1 and i2) for class A reports and CRI for class B.

In some embodiments, the sTTI and TTI transmission have different transmission modes, and the CSI reports for 1 ms TTI and sTTI may have separate sets of parameters. In some embodiments, the UE may report separate CSI reports for different transmission modes on the 1 ms TTI UL channels. At least one of the CSI reports may correspond to a transmission mode configured for a 1 ms TTI and one of the CSI reports may correspond to a transmission mode configured for sTTI. In some embodiments, a time pattern (or subframe pattern) for reporting CSI feedback may be used by the UE to distinguish for which transmission mode CSI feedback has to be reported in a 1 ms TTI. In some embodiments, a field in the UL DCI corresponding to the CSI feedback request indicates the transmission mode for which CSI feedback has to be reported in a 1 ms TTI.

Some embodiments provide for using different transmission modes. For example, in case of different transmission modes (TM) for 1 ms TTI and sTTI, two completely separate CSI reports may need to be maintained by the UE. One CSI report may include the transmission mode used for 1 ms TTI and the other CSI report may include the transmission mode used for sTTI. The CSI reporting procedure for the transmission mode configured for 1 ms TTI can remain unchanged. The CSI reporting for the transmission mode for sTTI can apply the proposed two CSI feedback loops concept, i.e. one part of the CSI information is reported on 1 ms TTI UL channels and one part of the CSI information is reported on sTTI. In such embodiments, the UE may use 1 ms TTI UL channels for reporting CSI feedback for the transmission mode configured for 1 ms TTI and for reporting CSI feedback for the transmission mode configured for sTTI.

To be able to distinguish for which TM the CSI feedback is requested on a 1 ms TTI, two methods may be considered. In a first method, which may be applicable to periodic CSI transmission, the eNB configures a time pattern for reporting CSI information on 1 ms TTI UL channels for the transmission mode configured for sTTI. For instance, every 5th subframe the UE is expected to report CSI information on 1 ms TTI UL channels (PUSCH or PUCCH) for the transmission mode configured for sTTI. If the eNB wants to receive CSI feedback for the TM configured for 1 ms TTI, the eNB can request and/or configure the TM to receive the CSI feedback in a different subframe than the ones configured for the TM configured for sTTI. In some embodiments, the eNB can overwrite the time pattern by issuing an aperiodic CSI feedback request for the TM configured for 1 ms TTI (i.e. send a CSI request on an 1 ms TTI UL grant/UL DCI). In a second method, which may be applicable to an aperiodic CSI transmission, a field is added in the UL grant/UL DCI to indicate whether the CSI feedback request corresponds to the TM configured for 1 ms TTI or to the TM configured for sTTI.

Figure 9:
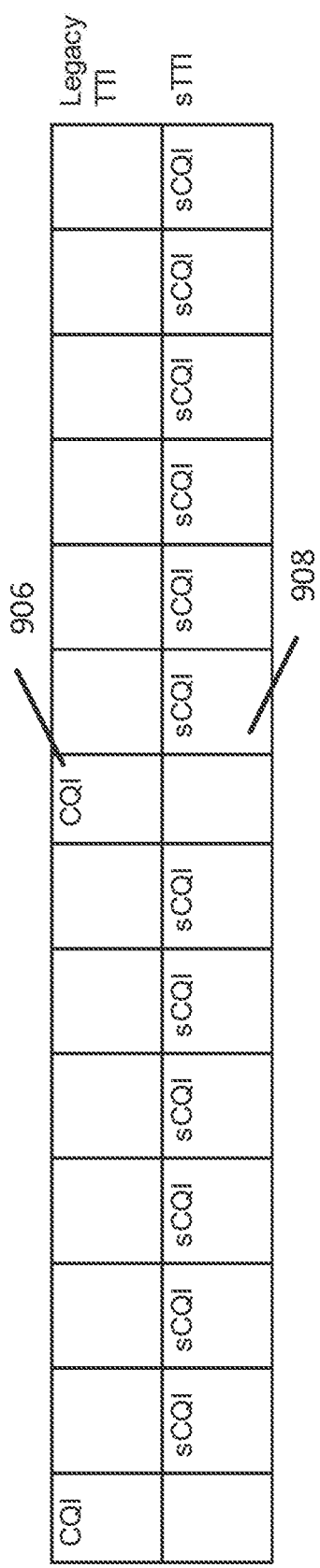
FIG. 9 illustrates sCQI according to some embodiments disclosed herein.

Some embodiments may include providing new sCQI reports. As discussed above, CSI reports for PMI are reported over PUCCH or PUSCH. To save bits in the sCQI report, the CQI report for sCQI can be reported in several different ways according to embodiments herein. For example, in some embodiments, sCQI may be reported using the same format as legacy CQI. In some embodiments, sCQI may be reported using fewer bits than legacy CQI by using a higher code rate and/or more power. In some embodiments, sCQI can be reported as a difference between the TTI reported CQI and the sTTI CQI. In such embodiments, legacy CQI may still be reported on PUCCH and sCQI may then be reported as a function of the legacy CQI. An illustration of the CQI and sCQI periodicity is shown in FIG. 9, illustrates CQI 906 and sCQI 908 according to some embodiments disclosed herein. Embodiments herein may be applied both to periodic CQI over sPUCCH or aperiodic CQI over sPUSCH The described embodiments may be implemented in any appropriate type of communication system supporting any suitable communication standards and using any suitable components. As one example, certain embodiments may be implemented in a communication system such as that illustrated in FIG. 10. Although certain embodiments are described with respect to LTE systems and related terminology, the disclosed concepts are not limited to LTE or a 3GPP system. Additionally, although reference may be made to the term "cell", the described concepts may also apply in other contexts, such as beams used in Fifth Generation (5G) systems, for instance.

Figure 10:
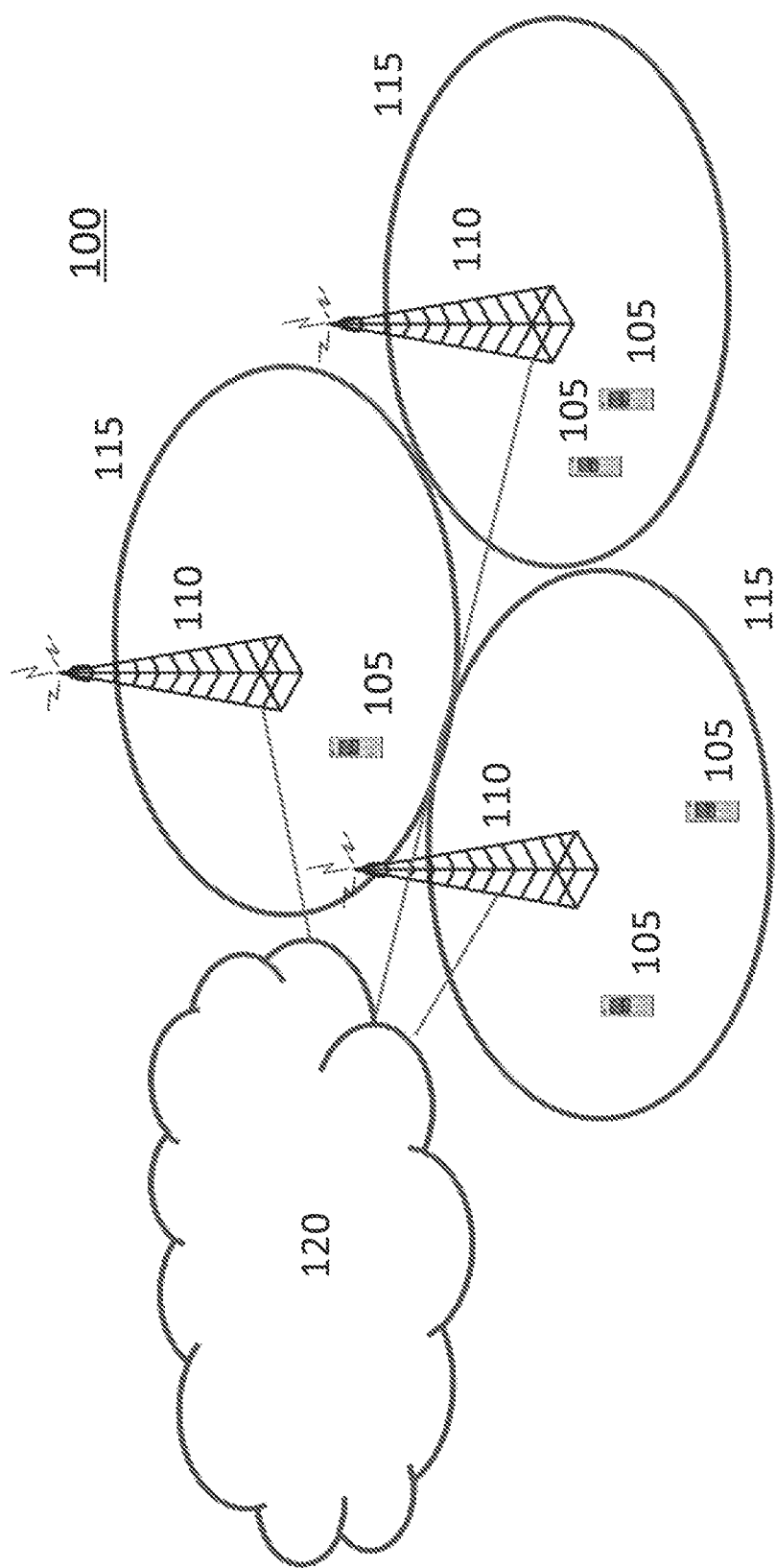
FIG. 10 illustrates a communication system according to some embodiments disclosed herein.

Referring to FIG. 10, a communication system 100 includes a plurality of wireless communication devices 105 (e.g., UEs, machine type communication [MTC]/machine-to-machine [M2M]UEs) and a plurality of radio access nodes 110 (e.g., eNodeBs or other base stations). Communication system 100 is organized into cells 115, which are connected to a core network 120 via corresponding radio access nodes 110. Radio access nodes 110 are capable of communicating with wireless communication devices 105 along with any additional elements suitable to support communication between wireless communication devices or between a wireless communication device and another communication device (such as a landline telephone).

Figure 11B:
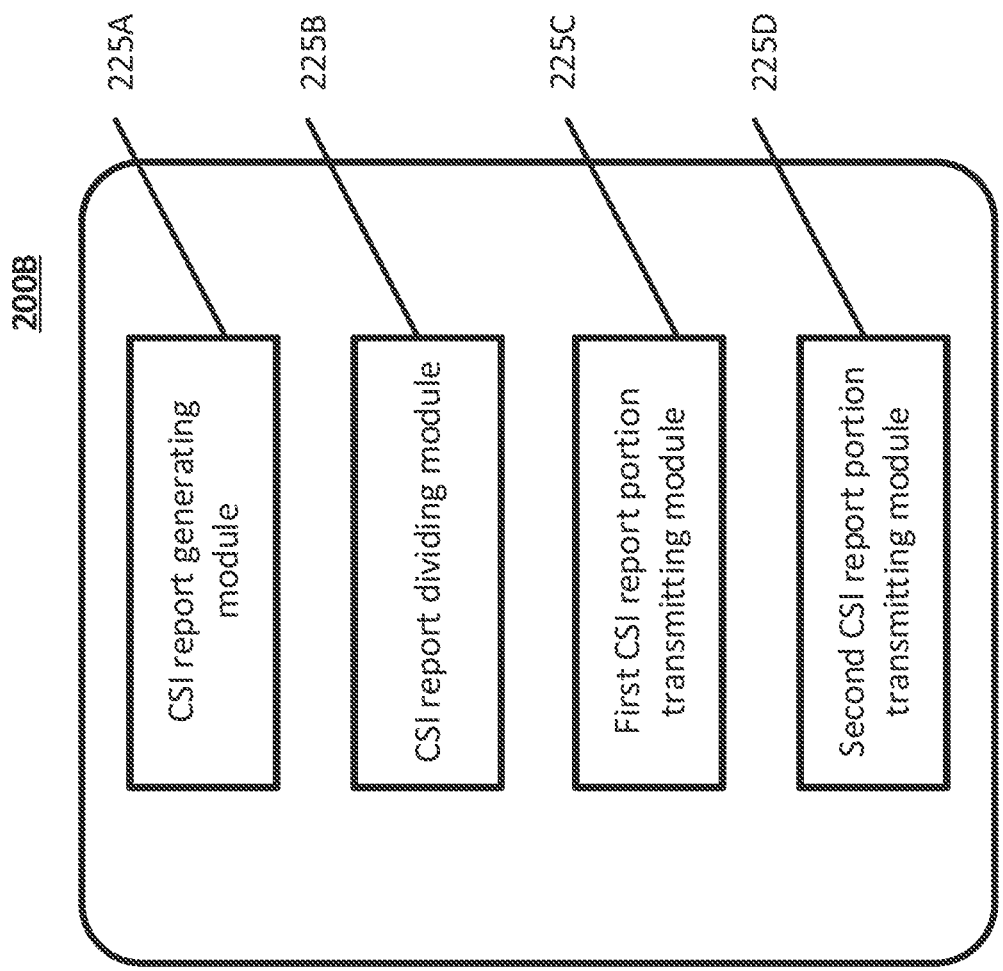
FIG. 11B illustrates a wireless communication device according to some embodiments disclosed herein.
Figure 11A:
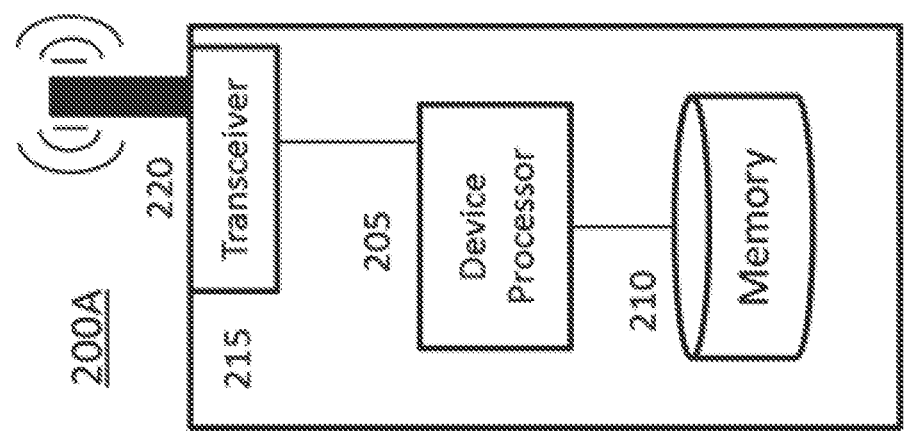
FIG. 11A illustrates a wireless communication device according to some embodiments disclosed herein.

Although wireless communication devices 105 may represent communication devices that include any suitable combination of hardware and/or software, these wireless communication devices may, in certain embodiments, represent devices such as those illustrated in greater detail by FIGS. 11A and 11B. Similarly, although the illustrated radio access node may represent network nodes that include any suitable combination of hardware and/or software, these nodes may, in particular embodiments, represent devices such those illustrated in greater detail by FIGS. 12A, 12B and 13.

Referring to FIG. 11A, a wireless communication device 200A comprises a processor 205 (e.g., Central Processing Units [CPUs], Application Specific Integrated Circuits [ASICs], Field Programmable Gate Arrays [FPGAs], and/or the like), a memory 210, a transceiver 215, and an antenna 220. In some embodiments, some or all of the functionality described as being provided by UEs, MTC or M2M devices, and/or any other types of wireless communication devices may be provided by the device processor executing instructions stored on a computer-readable medium, such as memory 210. Some embodiments may include additional components beyond those shown in FIG. 11A that may be responsible for providing certain aspects of the device's functionality, including any of the functionality described herein.

Referring to FIG. 11B, a wireless communication device 200B includes at least one module 225 configured to perform one or more corresponding functions. Examples of such functions include various method steps or combinations of method steps as described herein with reference to wireless communication device(s). In general, a module 225 may comprise any suitable combination of software and/or hardware configured to perform the corresponding function. For instance, in some embodiments a module 225 comprises software configured to perform a corresponding function when executed on an associated platform, such as that illustrated in FIG. 11A.

As illustrated, the modules 225 may include a CSI report generating module 225A that is configured to generate a CSI report for transmission to a network node that uses the CSI report to make a scheduling decision. A CSI report dividing module 225B may be configured to divide the CSI report into a first CSI report portion and a second CSI report portion. In some embodiments, the first CSI report portion may include a first payload of data and the second CSI report portion include a second payload of data that is less than the first payload of data. A first CSI report portion transmitting module 225C may be configured to transmit the first CSI report portion on a transmission time interval (TTI) channel having a first time interval value. A second CSI report portion transmitting module 225D may be configured to transmit the second CSI report portion on a short TTI (sTTI) channel having a second time interval value that is less than the first time interval value. Some embodiments provide that the first CSI report portion and the second CSI report portion include data that is combined to construct the CSI report.

Figure 12B:
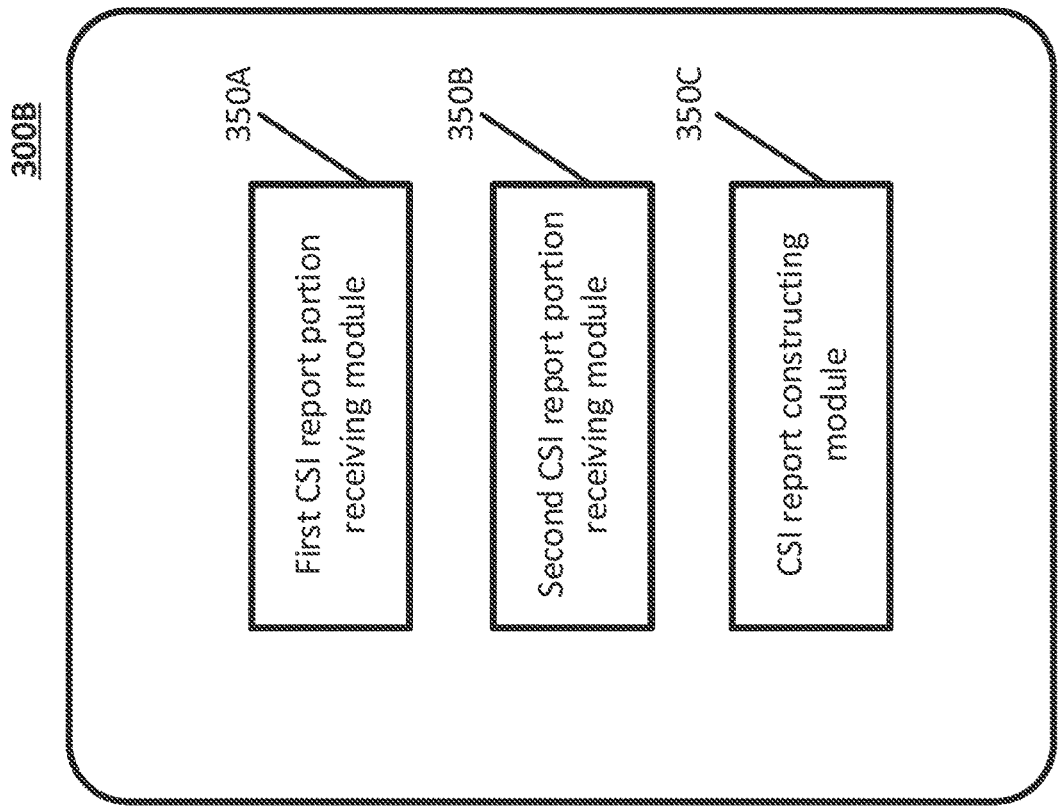
FIG. 12B illustrates a radio access node according to some embodiments disclosed herein.
Figure 12A:
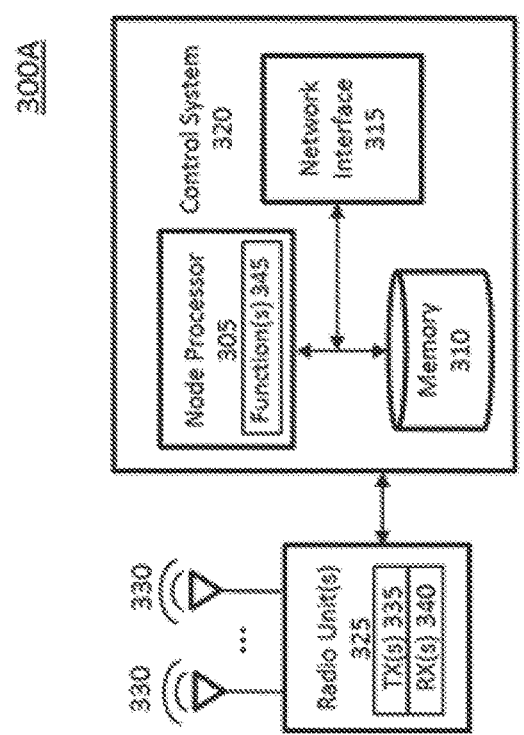
FIG. 12A illustrates a radio access node according to some embodiments disclosed herein.

Reference is now made to FIG. 12A, which illustrates a radio access node according to some embodiments disclosed herein. As illustrated, a radio access node 300A includes a control system 320 that includes a node processor 305 (e.g., Central Processing Units (CPUs), Application Specific Integrated Circuits (ASICs), Field Programmable Gate Arrays (FPGAs), and/or the like), memory 310, and a network interface 315. In addition, radio access node 300A includes at least one radio unit 325 including at least one transmitter 335 and at least one receiver coupled to at least one antenna 330. In some embodiments, radio unit 325 is external to control system 320 and connected to control system 320 via, e.g., a wired connection (e.g., an optical cable). However, in some embodiments, radio unit 325 and potentially the antenna 330 are integrated together with control system 320. Node processor 305 operates to provide at least one function 345 of radio access node 300A as described herein. In some embodiments, the function(s) are implemented in software that is stored, e.g., in the memory 310 and executed by node processor 305.

Figure 3:
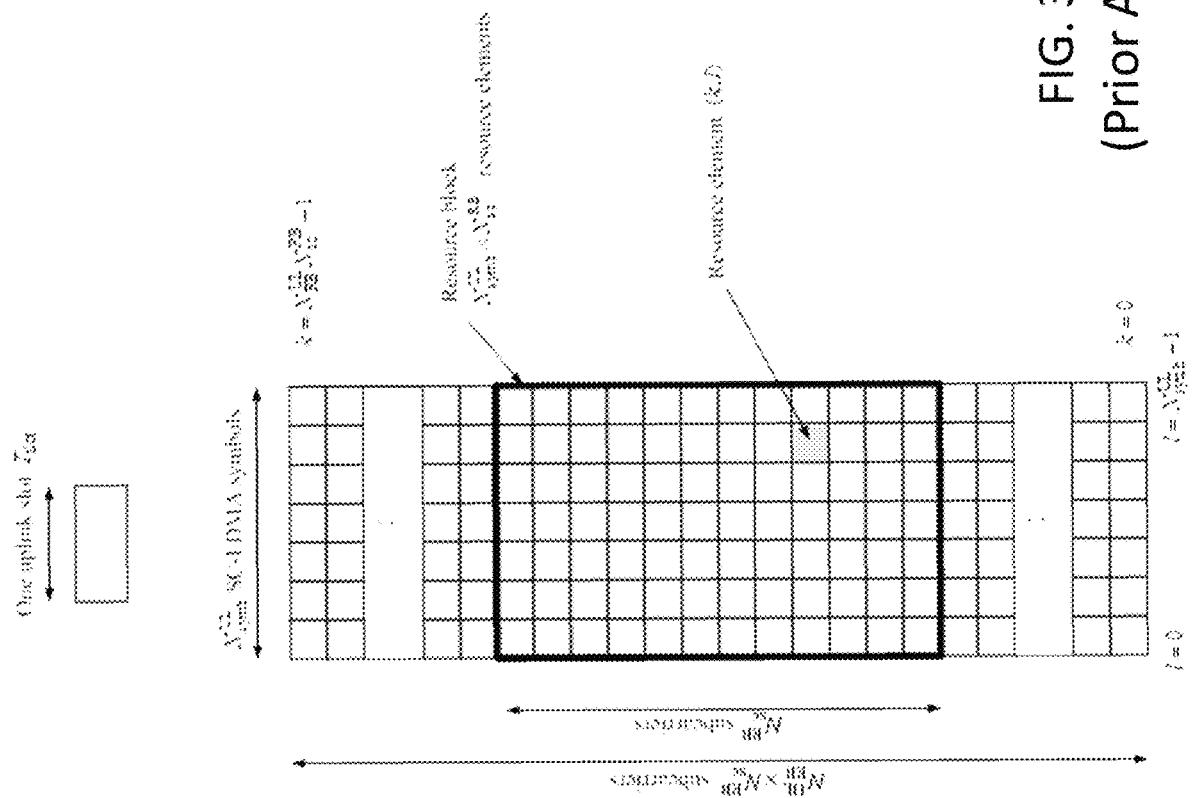
FIG. 3 illustrates LTE uplink resource grid.
Figure 4:
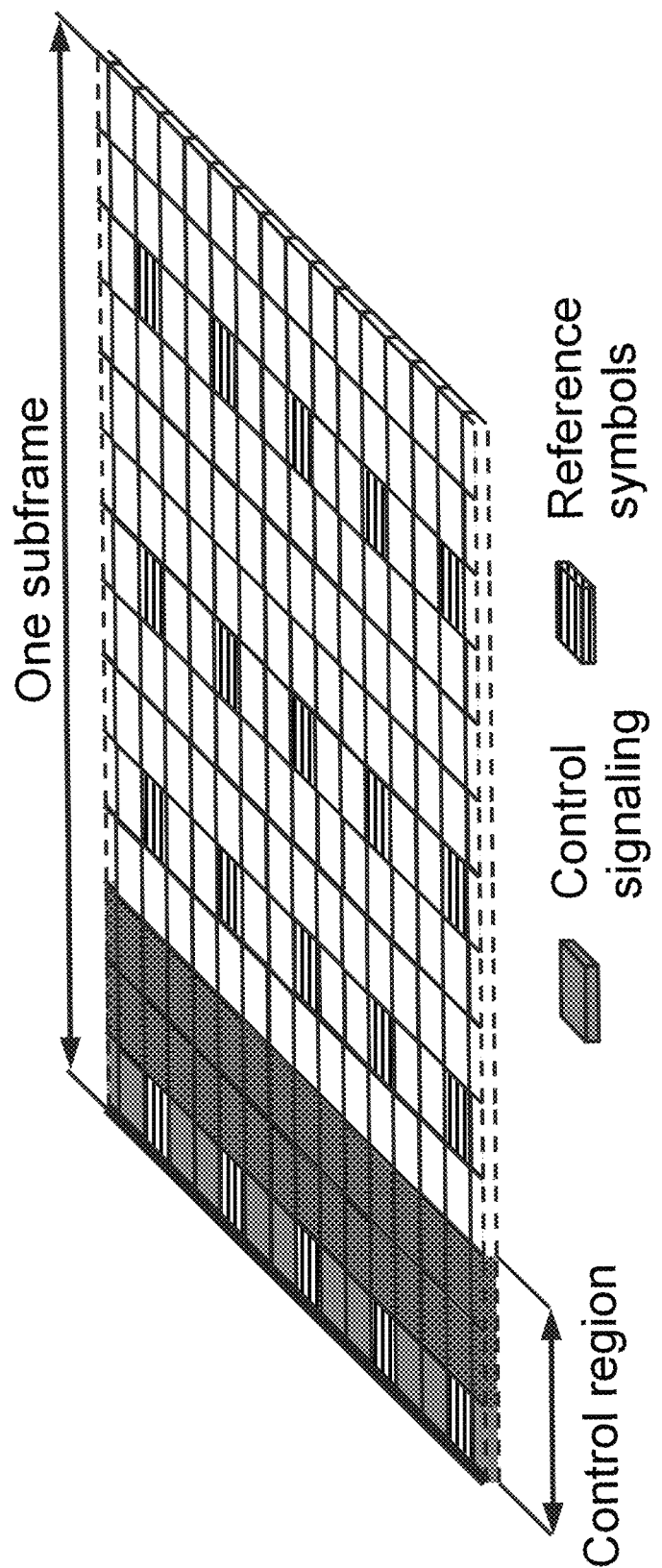
FIG. 4 illustrates a downlink subframe.

In some embodiments, some or all of the functionality described as being provided by a base station, a node B, an enodeB, and/or any other type of network node may be provided by node processor 305 executing instructions stored on a computer-readable medium, such as memory 310 shown in FIG. 3A. Some embodiments of radio access node 300 may include additional components to provide additional functionality, such as the functionality described herein and/or related supporting functionality.

Reference is now made to FIG. 12B, which illustrates a radio access node according to some embodiments disclosed herein. As illustrated, a radio access node 300B includes at least one module 350 that is configured to perform one or more corresponding functions. Examples of such functions include various method steps, operations, and/or combinations of method steps and/or operations as described herein with reference to radio access node(s). In general, a module 350 may include any suitable combination of software and/or hardware configured to perform the corresponding function. For instance, in some embodiments a module 350 includes software configured to perform a corresponding function when executed on an associated platform, such as that illustrated in FIG. 12A.

As illustrated, the modules 350 may include a first CSI report portion receiving module 350A that is configured to receive a first CSI report portion that includes a first payload of data on a transmission time interval (TTI) channel having a first time interval value. A second CSI report portion receiving module 350B may be configured to receive a second CSI report portion having a second payload of data that is less than the first payload of data on a short TTI (sTTI) channel having a second time interval value that is less than the first time interval value. A CSI report constructing module 350C may be configured to construct a CSI report using the first CSI report portion that was received on the TTI channel and the second CSI report portion that was received on the sTTI channel.

Reference is now made to FIG. 13, which illustrates a radio access node according to some embodiments disclosed herein. As illustrated, a virtualized radio access node 400 may be configured to operate according to some embodiments disclosed herein. The concepts described in relation to FIG. 13 may be similarly applied to other types of network nodes. Further, other types of network nodes may have similar virtualized architectures. As used herein, the term "virtualized radio access node" refers to an implementation of a radio access node in which at least a portion of the functionality of the radio access node is implemented as a virtual component(s) (e.g., via a virtual machine(s) executing on a physical processing node(s) in a network(s)).

Referring to FIG. 13, a radio access node 400 includes control system 320 as described in relation to FIG. 12A. Control system 320 is connected to one or more processing nodes 420 coupled to and/or included as part of a network(s) 425 via network interface 315. Each processing node 420 includes one or more processors 405 (e.g., CPUs, ASICs, FPGAs, and/or the like), memory 410, and a network interface 415.

In this example, functions 345 of radio access node 300A described herein are implemented at the one or more processing nodes 420 or distributed across control system 320 and the one or more processing nodes 420 in any desired manner. In some embodiments, some or all of the functions 345 of radio access node 300A described herein are implemented as virtual components executed by one or more virtual machines implemented in a virtual environment(s) hosted by processing node(s) 420. As will be appreciated, additional signaling or communication between processing node(s) 420 and control system 320 is used in order to carry out at least some of the desired functions 345. As indicated by dotted lines, in some embodiments control system 320 may be omitted, in which case the radio unit(s) 325 communicate directly with the processing node(s) 420 via an appropriate network interface(s).

In some embodiments, a computer program includes instructions which, when executed by at least one processor, causes at least one processor to carry out the functionality of a radio access node (e.g., radio access node 110 or 300A) or another node (e.g., processing node 420) implementing one or more of the functions of the radio access node in a virtual environment according to any of the embodiments described herein.

Figure 14:
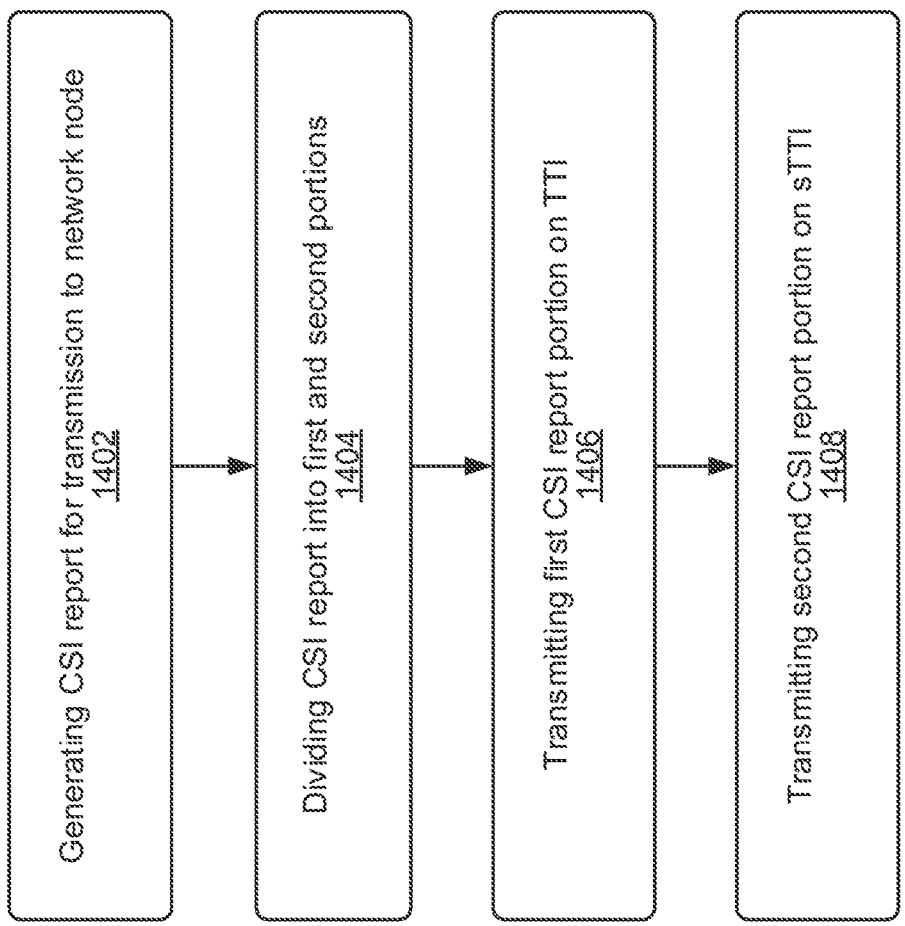
FIGS. 14 and 15 are flowcharts illustrating operations according to some embodiments disclosed herein.

Reference is now made to FIG. 14, which is a flowchart illustrating operations according to some embodiments disclosed herein. Embodiments include methods of reporting channel state information (CSI) in a wireless device in a wireless communication network. Methods may include generating a CSI report for transmission to a network node that uses the CSI report to make a scheduling decision (block 1402). In some embodiments, the generating is performed at the wireless device. Some embodiments include dividing the CSI report into a first CSI report portion and a second CSI report portion (block 1404). In some embodiments, the first CSI report portion may include a first payload of data and the second CSI report portion may include a second payload of data that is less than the first payload of data. Embodiments may include transmitting the first CSI report portion on a transmission time interval (TTI) channel having a first time interval value (block 1406). Some embodiments include transmitting the second CSI report portion on a short TTI (sTTI) channel having a second time interval value that is less than the first time interval value (block 1408). In some embodiments, the first CSI report portion and the second CSI report portion include data that is combined to construct the CSI report.

In some embodiments, the sTTI includes multiple sTTIs and the second CSI report portion may be split into at least two groups. Each of the groups may correspond to a different one of the sTTIs. In some embodiments, the first CSI report portion is transmitted on two TTI channels that are temporally divided from one another by a given number of frames. For example, a TTI channel may be periodically provided once every N subframes. The second CSI report portion may include updated and/or complementary information that is transmitted in a given number of frames that are between two TTI channels.

Some embodiments provide that the first time interval value is at least 1 millisecond and the second time interval value is less than half of the first time interval value. In some embodiments, the CSI report includes one or more of rank indication (RI), precoder matrix indication (PMI) and channel-quality indication (CQI). Some embodiments provide that the CQI and the RI are transmitted via the sTTI channel and the PMI is transmitted via the TTI channel. In some embodiments, the CQI is transmitted via the sTTI channel and the PMI and the RI are transmitted via the TTI channel. Some embodiments provide that the CQI includes a shortened CQI (sCQI) that is configured to be transmitted aperiodically over a shortened PUSCH (sPUSCH) in response to receiving a trigger for CSI reporting over a shortened PDCCH (sPDCCH).

In some embodiments, the CSI is a shortened CSI (sCSI) that is transmitted on sPUCCH responsive to receiving a request on sPDCCH using a shortened downlink control information (sDCI). Some embodiments provide that information in the sCSI report that is transmitted on the sTTI channel is necessary for interpreting information in the first CSI portion that is transmitted on the TTI. In some embodiments, the sCSI report includes an updated CQI value that corresponds to the PMI in the first CSI report portion that is transmitted in the TTI channel. Some embodiments provide that the sCQI report includes a differential CQI value that is configured to be added to the CQI value in the first CSI report portion transmitted on the TTI to obtain an updated CQI value. In some embodiments, the first CSI report portion includes a first information amount and the second CSI report portion includes a second information amount that is less than the first information amount.

Some embodiments provide that the TTI channel and the sTTI channel use a same transmission mode. In some embodiments, the TTI channel and the sTTI channel use different transmission modes relative to one another and the first CSI report portion includes sets of parameters that are different from those in the second CSI report portion. Some embodiments provide that a transmission mode is determined responsive to receiving an indication in a DCI. In some embodiments, a first transmission mode is maintained for the TTI and a second transmission mode is maintained for the sTTI.

Figure 15:
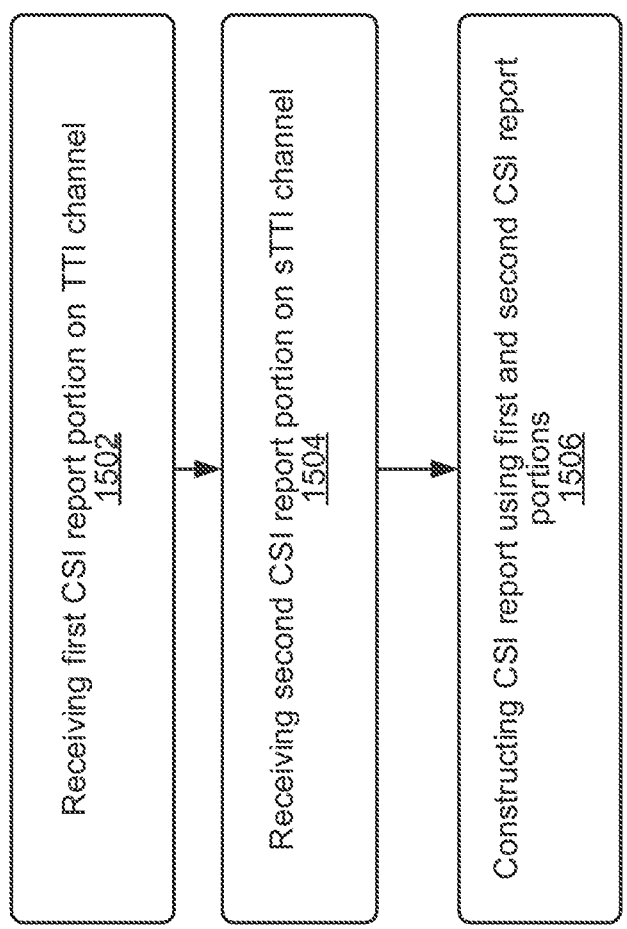

Reference is now made to FIG. 15, which is a flowchart illustrating operations according to some embodiments disclosed herein. Embodiments include methods of operating a network node in a wireless communication network. Methods may include receiving a first CSI report portion that includes a first payload of data on a transmission time interval (TTI) channel having a first time interval value (block 1502). A second CSI report portion having a second payload of data that is less than the first payload of data may be received on a short TTI (sTTI) channel having a second time interval value that is less than the first time interval value (block 1504). A CSI report may be constructed using the first CSI report portion that was received on the TTI channel and the second CSI report portion that was received on the sTTI channel (block 1506).

In some embodiments, the sTTI includes multiple sTTIs and two or more groups of the second CSI report portion may be received on different ones of the sTTIs. In some embodiments, the first CSI report portion is received on two TTI channels that are temporally divided from one another by a given number of frames. Some embodiments provide that the second CSI report include updated and/or complementary information that is received in the given number of frames that are between the two TTI channels. Some embodiments provide that the first time interval value is at least 1 millisecond and the second time interval value is less than half of the first time interval value.

In some embodiments, the CSI report includes one or more of rank indication (RI), precoder matrix indication (PMI) and channel-quality indication (CQI). In some embodiments, the CQI and the RI are received via the sTTI channel and the PMI is received via the TTI channel. Some embodiments provide that the CQI is received via the sTTI channel and the PMI and the RI are received via the TTI channel.

In some embodiments, a trigger for CSI reporting is sent over a shortened PDCCH (sPDCCH). The CQI includes a shortened CQI (sCQI) that is configured to be received aperiodically over a shortened PUSCH (sPUSCH) in response to sending the trigger for CSI reporting. In some embodiments, a request is sent on sPDCCH using a shortened downlink control information (sDCI). The CSI may include a shortened CSI (sCSI) that is received on sPUCCH responsive to sending the request on sPDCCH. Some embodiments provide that information in the sCSI report that is received on the sTTI channel is necessary for interpreting information in the first CSI portion that is received on the TTI.

In some embodiments, the sCSI report includes an updated CQI value that corresponds to the PMI in the first CSI report portion that is received in the TTI channel Some embodiments provide that the sCQI report includes a differential CQI value that is configured to be added to the CQI value in the first CSI report portion received on the TTI to obtain an updated CQI value. In some embodiments, the first CSI report portion includes a first information amount and the second CSI report portion includes a second information amount that is less than the first information amount.

In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

LIST OF ABBREVIATIONS

CP Cyclic Prefix
CQI Channel Quality Indicator
CSI Channel State Information
eNB Enhanced Node B
EPDCCH Enhanced Physical Downlink Control Channel
LEO Low Earth Orbit
LTE Long Term Evolution
NR New Radio
OFDM Orthogonal Frequency Division Multiplexing
OFDMA Orthogonal Frequency-Division Multiple Access
PDSCH Physical Downlink Shared Channel
PDCCH Physical Downlink Control Channel
PMI Precoder Matrix Indication
PRACH Physical Random Access Channel
PSS Primary Synchronization Signal
PUSCH Physical Uplink Shared Channel
PUCCH Physical Uplink Control Channel
RI Rank Indication
SC-FDMA Single-carrier Frequency-division Multiple Access
SSS Secondary Synchronization Signal
sCQI Shortened Channel Quality Indicator
sCSI Shortened Channel State Information
sPUSCH Shortened Physical Uplink Shared Channel
sTTI Short Transmission Time Interval
TTI Transmission Time Interval
ToA Time of Arrival
UE User Equipment When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random-access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BluRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present disclosure may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

What is claimed is:

1. A method of reporting channel state information (CSI) in a wireless device in a wireless communication network, the method comprising:
   generating, at the wireless device, a CSI report for transmission to a network node that uses the CSI report to make a scheduling decision;
   dividing the CSI report into a first CSI report portion and a second CSI report portion, the first CSI report portion including a first payload of data and the second CSI report portion including a second payload of data that is less than the first payload of data;
   transmitting the first CSI report portion on two transmission time intervals (TTIs) having a first time interval value, wherein the two TTIs are temporally divided from one another by a given number of frames; and
   transmitting the second CSI report portion on a short TTI (sTTI) having a second time interval value that is less than the first time interval value, wherein the first CSI report portion and the second CSI report portion comprise data that is combined to construct the CSI report, wherein the second CSI report portion comprises one or more of updated information or complimentary information that is transmitted in a given number of frames that are between the two TTIs.

2. The method of claim 1, wherein the sTTI comprises a plurality of sTTIs, the method further comprising:
   splitting the second CSI report portion into at least two groups; and
   transmitting each of the at least two groups corresponding to the second CSI report portion on different ones of the plurality of sTTIs.

3. The method of claim 1, wherein the first time interval value is at least 1 millisecond and the second time interval value is less than half of the first time interval value.

4. The method of claim 1, wherein the CSI report comprises at least one of rank indication (RI), precoder matrix indication (PMI) and channel-quality indication (CQI),
   wherein the CQI and the RI are transmitted at the sTTI, and
   wherein the PMI is transmitted at the two TTIs.

5. The method of claim 4, wherein the CQI comprises a shortened CQI (sCQI) that is configured to be transmitted aperiodically over a shortened PUSCH (sPUSCH) in response to receiving a trigger for CSI reporting over a shortened PDCCH (sPDCCH).

6. The method of claim 4, wherein the CSI comprises a shortened CSI (sCSI) that is transmitted on sPUCCH responsive to receiving a request on sPDCCH using a shortened downlink control information (sDCI).

7. The method of claim 1, wherein the CSI report comprises at least one of rank indication (RI), precoder matrix indication (PMI) and channel-quality indication (CQI),
   wherein the CQI is transmitted at the sTTI, and
   wherein the PMI and the RI are transmitted at the two TTIs.

8. A method of operating a network node in a wireless communication network, the method comprising:
   receiving a first Channel State Information (CSI) report portion that includes a first payload of data on two transmission time intervals (TTIs) having a first time interval value, wherein the two TTIs are temporally divided from one another by a given number of frames;

receiving a second CSI report portion having a second payload of data that is less than the first payload of data on a short TTI (sTTI) having a second time interval value that is less than the first time interval value, wherein the second CSI report portion comprises one or more of updated information or complimentary information that is transmitted in a given number of frames that are between the two TTIs; and constructing a CSI report using the first CSI report portion that was received on the two TTIs and the second CSI report portion that was received on the sTTI.

9. The method of claim 8, wherein the sTTI comprises a plurality of sTTIs, the method further comprising:

receiving at least two groups of the second CSI report portion on different ones of the plurality of sTTIs.

10. The method of claim 8, wherein the first time interval value is at least 1 millisecond and the second time interval value is less than half of the first time interval value.

11. A network node, comprising:

a transceiver to provide wireless communication over a radio interface;

at least one processor coupled to the transceiver; and at least one memory coupled to the at least one processor and storing program code that when executed by the at least one processor causes the at least one processor to perform operations comprising:

receiving a first Channel State Information (CSI) report portion that includes a first payload of data on two transmission time intervals (TTIs) having a first time interval value, wherein the two TTIs are temporally divided from one another by a given number of frames;

receiving a second CSI report portion having a second payload of data that is less than the first payload of data on a short TTI (sTTI) having a second time interval value that is less than the first time interval value, wherein the second CSI report portion comprises one or more of updated information or complimentary information that is transmitted in a given number of frames that are between the two TTIs; and constructing a CSI report using the first CSI report portion that was received on the two TTIs and the second CSI report portion that was received on the sTTI.

12. A wireless communication device (UE) comprising:

a transceiver to provide wireless communication over a radio interface;

at least one processor coupled to the transceiver; and at least one memory coupled to the at least one processor and storing program code that when executed by the at least one processor causes the at least one processor to perform operations comprising:

generating, at the wireless device, a Channel State Information (CSI) report for transmission to a network node that uses the CSI report to make a scheduling decision;

dividing the CSI report into a first CSI report portion and a second CSI report portion, the first CSI report portion including a first payload of data and the second CSI report portion including a second payload of data that is less than the first payload of data;

transmitting the first CSI report portion on two transmission time intervals (TTIs) having a first time interval value, wherein the two TTIs are temporally divided from one another by a given number of frames; and transmitting the second CSI report portion on a short TTI (sTTI) having a second time interval value that is less than the first time interval value, wherein the first CSI report portion and the second CSI report portion comprise data that is combined to construct the CSI report, wherein the second CSI report portion comprises one or more of updated information or complimentary information that is transmitted in a given number of frames that are between the two TTIs.

13. The wireless communication device of claim 12, wherein the sTTI comprises a plurality of sTTIs, the operations further comprising:

splitting the second CSI report portion into at least two groups; and transmitting each of the at least two groups corresponding to the second CSI report portion on different ones of the plurality of sTTIs.

14. The wireless communication device of claim 12, wherein the first time interval value is at least 1 millisecond and the second time interval value is less than half of the first time interval value.

15. The wireless communication device of claim 12, wherein the CSI report comprises at least one of rank indication (RI), precoder matrix indication (PMI) and channel-quality indication (CQI), wherein the CQI and the RI are transmitted at the sTTI, and wherein the PMI is transmitted at the two TTIs.

16. The wireless communication device of claim 15, wherein the CQI comprises a shortened CQI (sCQI) that is configured to be transmitted aperiodically over a shortened PUSCH (sPUSCH) in response to receiving a trigger for CSI reporting over a shortened PDCCH (sPDCCH).

17. The wireless communication device of claim 16, wherein the sCSI report includes an updated CQI value that corresponds to the PMI in the first CSI report portion that is transmitted at the two TTIs.

18. The wireless communication device of claim 17, wherein the sCQI report includes a differential CQI value that is configured to be combined with the CQI value in the first CSI report portion transmitted on the two TTIs to obtain an updated CQI value.

19. The wireless communication device of claim 15, wherein the CSI comprises a shortened CSI (sCSI) that is transmitted on sPUCCH responsive to receiving a request on sPDCCH using a shortened downlink control information (sDCI).

20. The wireless communication device of claim 19, wherein information in the sCSI report that is transmitted at the sTTI is necessary for interpreting information in the first CSI portion that is transmitted at the two TTIs.

21. The wireless communication device of claim 15, wherein the first CSI report portion comprises a first information amount, wherein the second CSI report portion comprises a second information amount, and wherein the second information amount is less than the first information amount.

22. The wireless communication device of claim 12, wherein the CSI report comprises at least one of rank indication (RI), precoder matrix indication (PMI) and channel-quality indication (CQI), wherein the CQI is transmitted at the sTTI, and wherein the PMI and the RI are transmitted at the two TTIs.

23. The wireless communication device of claim 12, wherein data transmitted at the two TTIs and the sTTI use a same transmission mode.

24. The wireless communication device of claim 12, wherein data transmitted at the two TTIs and the sTTI use different transmission modes relative to one another, and wherein the first CSI report portion includes sets of parameters that are different from those in the second CSI report portion.

25. The wireless communication device of claim 24, further comprising determining a transmission mode responsive to receiving an indication in a DCI.

26. The wireless communication device of claim 24, wherein a first transmission mode is maintained for the two TTIs and a second transmission mode is maintained for the sTTI.

* * * * *